Dec. 10, 1946.   E. J. RABENDA   2,412,422
RECORDING APPARATUS
Filed Oct. 11, 1944   14 Sheets-Sheet 1

INVENTOR
EDWARD J. RABENDA
BY
ATTORNEY

Dec. 10, 1946.  E. J. RABENDA  2,412,422
RECORDING APPARATUS
Filed Oct. 11, 1944   14 Sheets-Sheet 2

INVENTOR
EDWARD J. RABENDA
BY
ATTORNEY

Dec. 10, 1946.　　　　E. J. RABENDA　　　　2,412,422
RECORDING APPARATUS
Filed Oct. 11, 1944　　　14 Sheets-Sheet 3
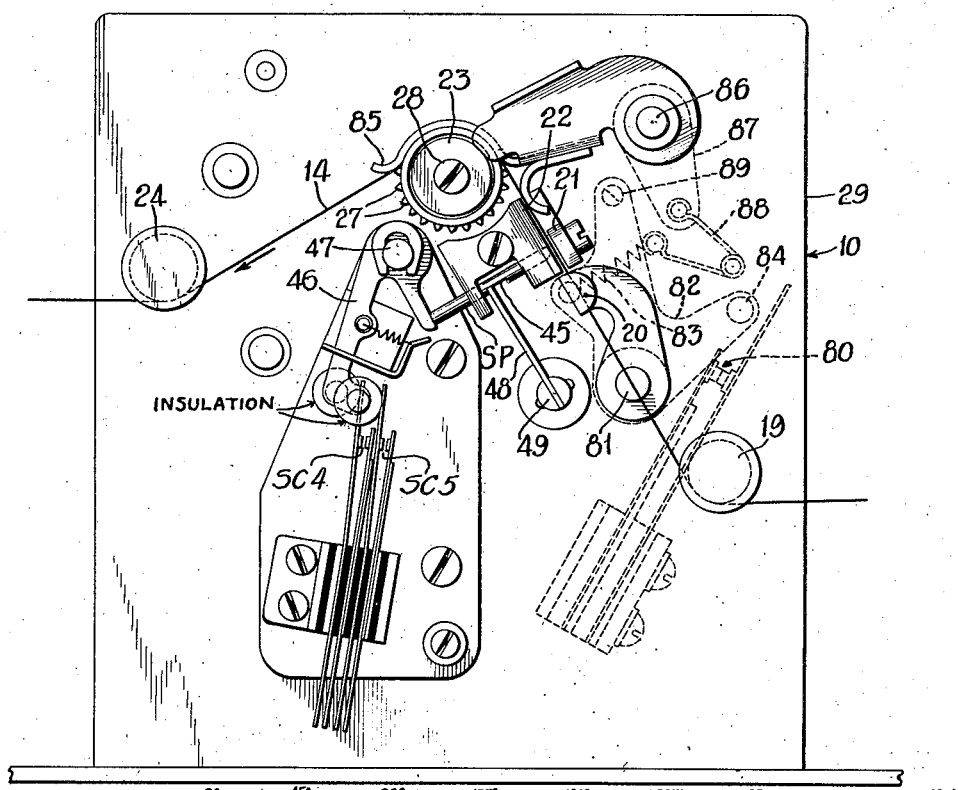
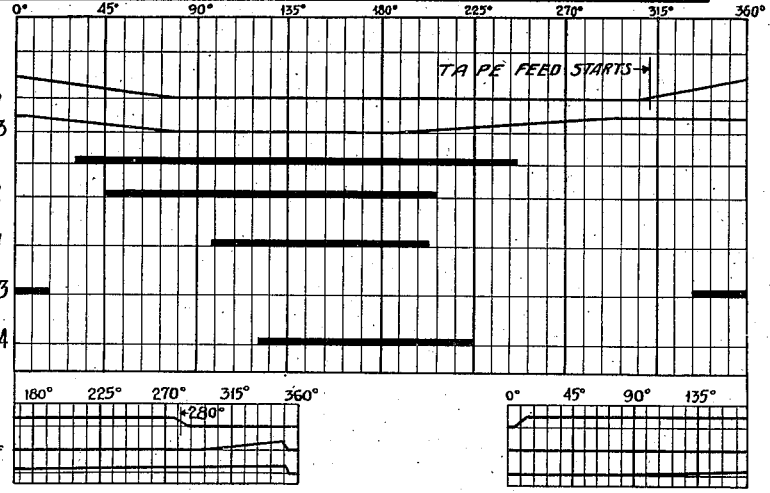
INVENTOR
EDWARD J. RABENDA
BY
ATTORNEY Dec. 10, 1946.   E. J. RABENDA   2,412,422
RECORDING APPARATUS
Filed Oct. 11, 1944   14 Sheets-Sheet 4

INVENTOR.
EDWARD J. RABENDA
BY
ATTORNEY.

Dec. 10, 1946.                E. J. RABENDA                2,412,422
                             RECORDING APPARATUS
                             Filed Oct. 11, 1944          14 Sheets-Sheet 5

INVENTOR
EDWARD J. RABENDA
BY
ATTORNEY

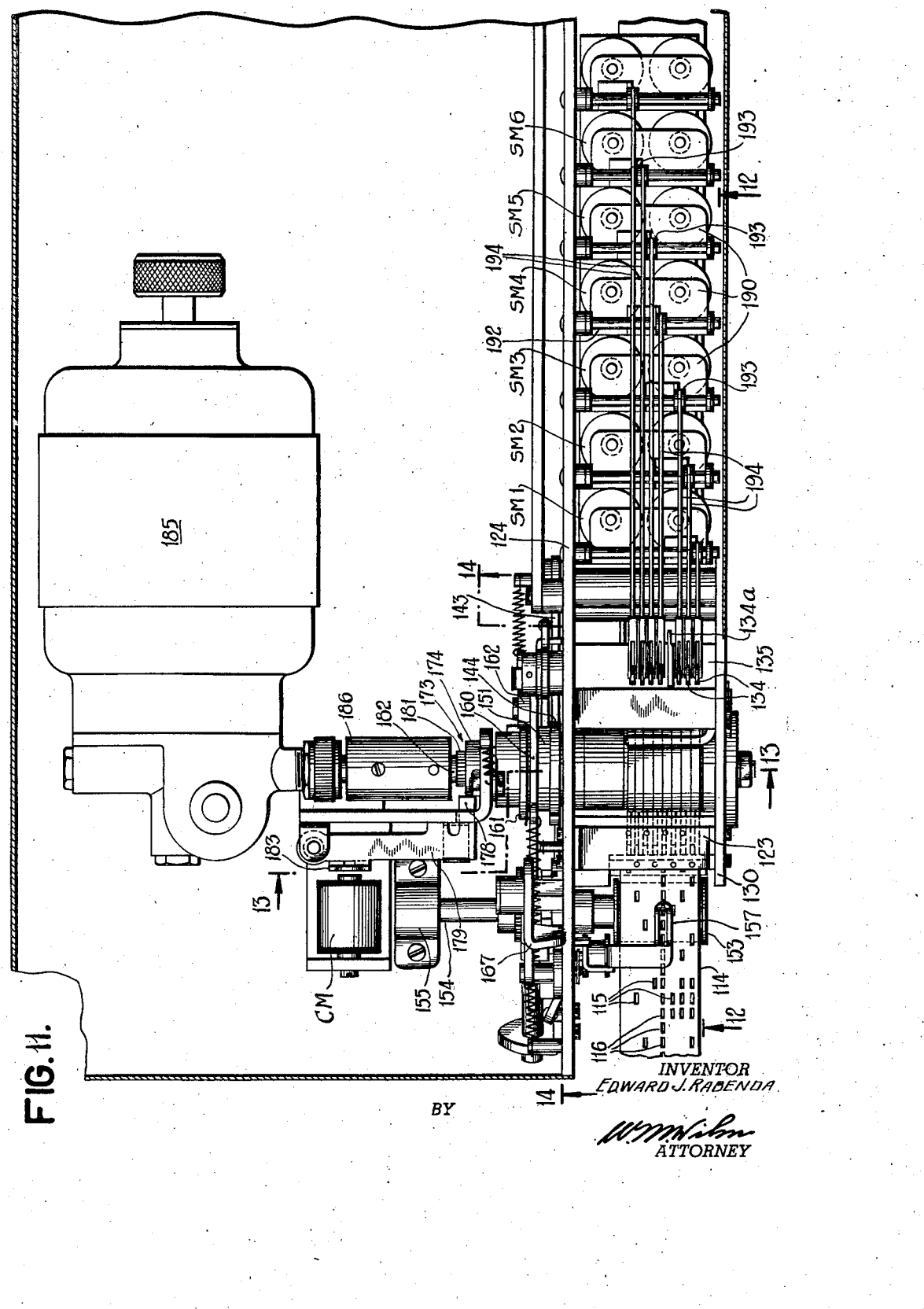

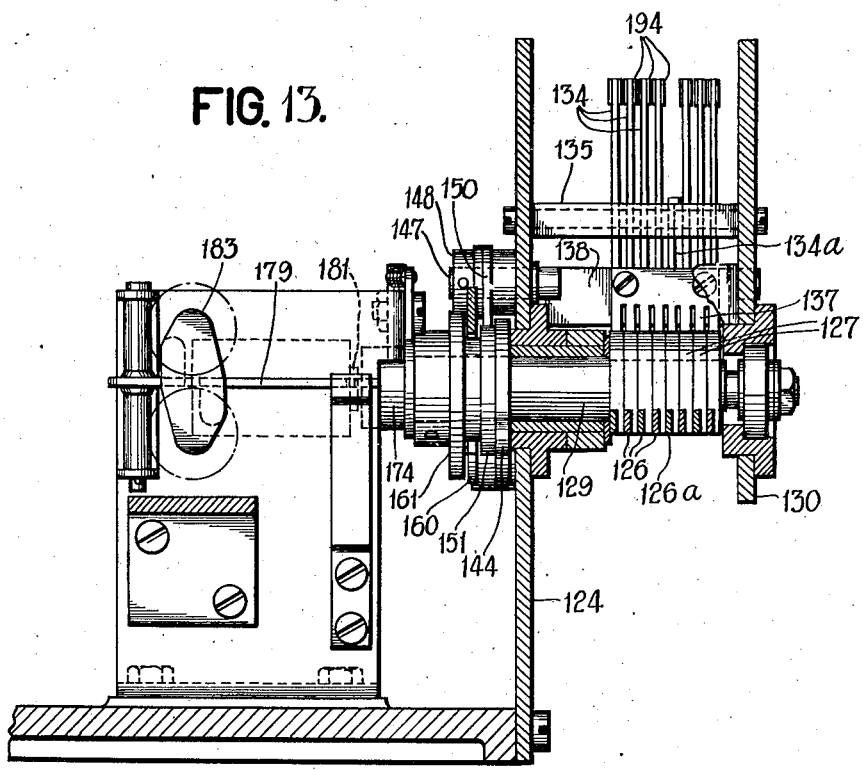

Dec. 10, 1946.  E. J. RABENDA  2,412,422
RECORDING APPARATUS
Filed Oct. 11, 1944  14 Sheets-Sheet 9
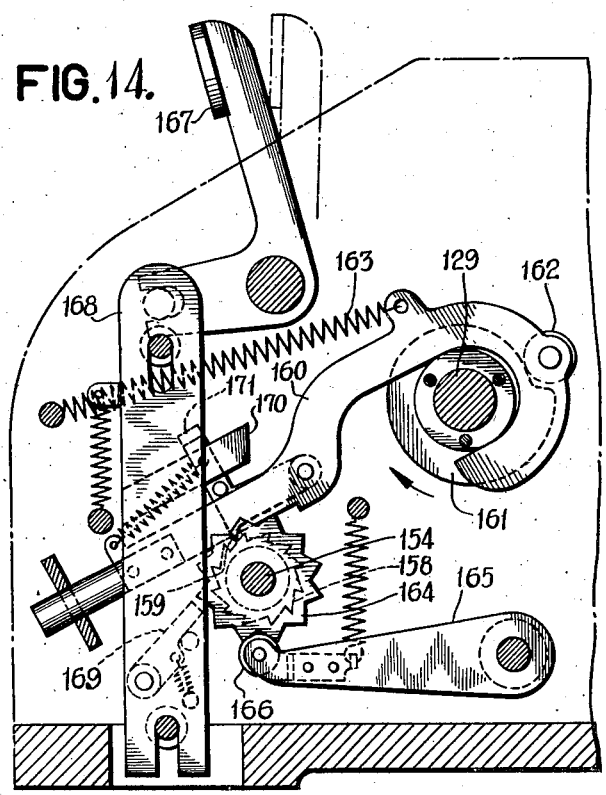
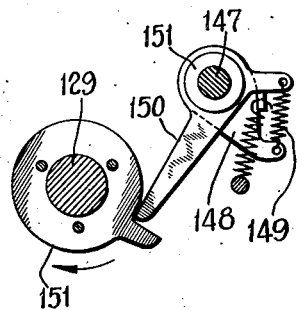
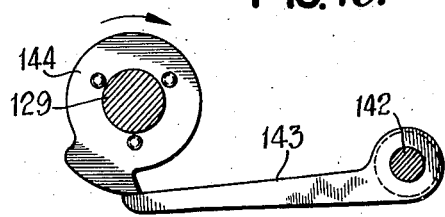
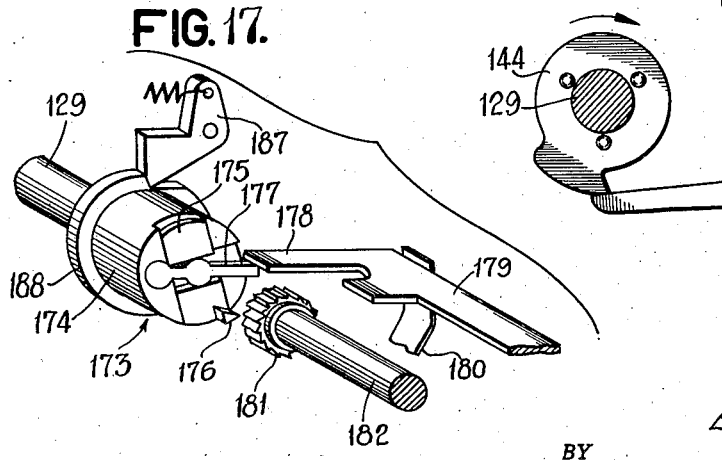
INVENTOR
EDWARD J. RABENDA
BY
ATTORNEY Dec. 10, 1946.  E. J. RABENDA  2,412,422
RECORDING APPARATUS
Filed Oct. 11, 1944  14 Sheets-Sheet 12

INVENTOR
EDWARD J. RABENDA
BY
ATTORNEY

Patented Dec. 10, 1946

2,412,422

UNITED STATES PATENT OFFICE 2,412,422

RECORDING APPARATUS

Edward J. Rabenda, Binghamton, N. Y., assignor to International Business Machines Corporation, New York, N. Y., a corporation of New York Application October 11, 1944, Serial No. 558,253

21 Claims. (Cl. 178—3)

This invention relates to apparatus for recording intelligence, such as a message, on a record sheet according to a predetermined code, and in such a manner that the record may be used to control the operation of other mechanisms; such, for example, as a machine which transcribes the recorded message.

The invention has for a general object to provide an apparatus of the above type which is of improved construction and arrangement of parts.

In the operation of transcribing machines, such as a conventional form of record-controlled typewriter, the coded record controls both the typing operations and the functional operations of the typewriter. Therefore, in recording the message on the record strip, the recording apparatus records code designations representing, respectively, the character data composing the intelligence and also records at the proper point the code designations representing, respectively, the required functional operations of the typewriter. In the conventional form of recording apparatus, the code designations are successively recorded in blank recording areas, or fields, of the record strip; strip feeding means being provided which spaces the strip once for each recording operation so as to bring the next blank recording area into recording position. The transcribing machine usually comprises a reading unit which senses the code designations in succession and includes a means for spacing the strip once for each sensing operation so as to bring the next code designation into position to be sensed. In a transcribing operation certain of the functional operations of the typewriter require more time for their completion that is normally required for a typing operation; for example, the tabulating operations and the operation of returning the carriage and line spacing the work copy to begin a new line of typing. Consequently, in order to prevent interference and resulting improper operation of the typewriter, provision must be made which acts as a result of the sensing of a code designation representing a functional operation requiring a longer than normal time for its completion, to prevent a second operation of the typewriter under the control of the next succeeding code designation, before the typewriter has completed such functional operation.

Therefore, according to a more specific aspect of the present invention, a further object is to provide an improved form of recording apparatus which, upon being operated to record a code designation representing a functional operation requiring a longer than normal time for completion by a transcribing machine, automatically provides in the record strip a predetermined number of recording areas, following the one containing such functional code designation, which following areas contain no code designation that will affect the operation of the transcribing machine, whereby when the strip is used to control the operation of a transcribing machine, such strip can be fed continuously through the reading means of the machine and the machine will have sufficient time to complete such functional operation before it can be operated by the next succeeding code designation calling for a machine operation.

While the present invention, when considered as to certain of its broader aspects, may be embodied in many different forms of apparatus having different uses, it is shown herein as being advantageously embodied in a recording apparatus which forms a part of a communication system wherein messages are received and recorded on a control tape according to a combinational hole code, for example, the well-known five-unit Baudot code. According to the embodiment disclosed herein, the recording apparatus functions to convert the message as recorded on the control tape in the five-unit code and record the message on a second tape in a different combinational hole code, for example, a commercially known six-unit code. The conversion and recording in this six-unit code on the second tape is effected in such a manner that the second tape can be effectively used to control the operation of a transcribing typewriter of the type referred to above.

The preferred embodiment of the recording apparatus which is disclosed herein, includes generally a means for successively sensing the code designation in the five-unit control tape and a means responsive to the sensing means and operable to convert each sensed code designation into a corresponding code designation of the six-unit code and to record the latter designation in the second tape. The recording apparatus is cyclically operable and during each normal operating cycle a code designation is sensed, converted, and the corresponding code designation of the six-unit code recorded in the second tape. During normal operation the control tape and the second tape are spaced once for each operating cycle. The recording apparatus of the present invention also advantageously comprises a cycling means providing when initiated a predetermined number of controlling cycles of operation; a means which operates in response to the sensing of a particular functional code designation, to initiate operation of said cycling means and to stop the sensing and spacing of the control tape; and a means which is controlled by the cycling means and provides for the spacing of the second tape once for each of the predetermined number of controlling cycles. The recording apparatus also includes a means which functions at the end of the predetermined number of controlling cycles for rendering the cycling means ineffective and for restoring the tape sensing and spacing means to normal operation. In the preferred embodiment disclosed herein the cycling means provides for spacing the second tape four times following the sensing, converting, and recording of a tabulating code designation, and six times following the sensing of a code designation representing the operation of the typewriter to begin a new line of typing, and the converting of such code designation and the recording of a corresponding code designation in the second tape.

A further object of the present invention is to provide a recording apparatus which effectively converts code representations recorded in a control record according to one code, into corresponding code representations in a different code and records such corresponding code representations in a second record and in such a manner that when a particular functional code representation in the control record is sensed the corresponding code representation in the different code is recorded in the second record and the second record is spaced a predetermined number of times.

A still further object is to provide an improved form of cycling control apparatus which when initiated provides a predetermined number of cycles of operation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a front elevational view of a portion of the unit shown in Fig. 1 and showing the tape sensing elements.

Fig. 6 is a timing chart indicating the operating relation between certain of the cyclically operable elements of the recording apparatus forming a preferred embodiment disclosed herein.

Fig. 7 is a detail view of a portion of a five-unit tape and showing as punched therein all of the character and functional code designations of the well-known five-unit Baudot code.

Fig. 8 shows a portion of a five-unit tape bearing the code designations of an illustrative message punched therein.

Fig. 9 shows a portion of a six-unit tape having punched therein all of the character and functional code designations of the commercially known six-unit code referred to hereinabove.

Fig. 10 is a view showing a portion of a six-unit tape and illustrating how the message disclosed in Fig. 8 appears when recorded in the six-unit code by the recording apparatus of the present invention.

Fig. 11 is a fragmentary plan view showing the essential elements of a six-unit code perforating unit forming a part of the recording apparatus.

Fig. 13 is a traverse vertical sectional view taken along the lines 13—13 of Fig. 11.

Fig. 14 is a sectional view taken along the lines 14—14 of Fig. 11 and showing the feeding means for the six-unit tape.

Fig. 15 is a detail view of the perforating unit and showing the cam control means for the knock-off or resetting means.

Fig. 16 is a detail view of the cam control means for the locking means.

Fig. 17 is an exploded view of the start-stop clutch means which also forms a part of the perforating unit.

Figure 1:
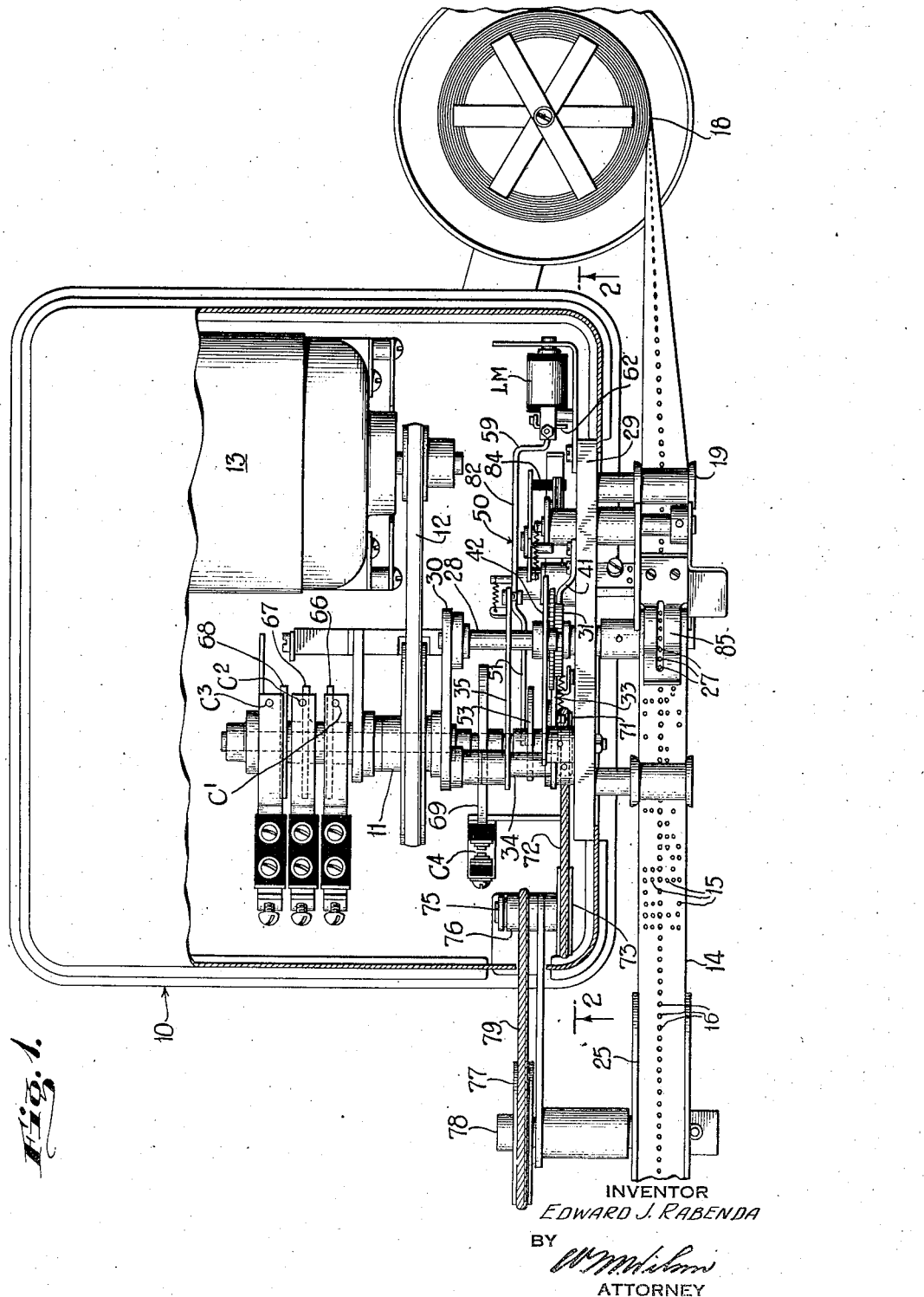
Fig. 1 is a plan view showing one unit of the recording apparatus, such unit providing for successively sensing and spacing the five-unit control tape and also including a mechanism which operates continuously in recurring cycles and provides a source of timing control of the recording apparatus as a whole.

Figs. 18a to 18e arranged sequentially below each other comprise a complete electrical wiring diagram showing the various instrumentalities and circuit connection of the recording apparatus comprising the preferred embodiment of the present invention.

*General description*

The recording apparatus disclosed in the drawings as one preferred embodiment of the present invention, comprises, generally, the five-unit tape reading and recording control unit 10 shown in Figs. 1 to 5 inclusive, the six-unit code perforator 110 shown in Figs. 11 to 16 inclusive, and a relay translator and relay cycling mechanism shown diagrammatically in Figs. 18a to 18e inclusive as a part of the electrical wiring diagram, which diagram discloses fully the circuit connections between the various electrical instrumentalities which are component parts of the recording apparatus. Before describing the detailed construction and operation of the preferred embodiment, a general outline of the functions of the principal operating parts of the apparatus will be set forth briefly.

The recording apparatus is cyclically operable under the control of a mechanism which operates continuously in recurring cycles. This mechanism is shown herein as forming a structural part of the unit 10 shown in Figs. 1 to 5 inclusive, and comprises a shaft 11 connected by a belt 12 to an electrical motor 13 which operates continuously while the apparatus is recording. As will appear more fully hereinafter, a cycle of operation of the recording apparatus is provided for during each revolution of the shaft 11.

The five-unit control tape 14 is advanced by the unit 10, under control of the shaft 11, one step for each recording cycle, for successively presenting the transverse rows, or recording areas, of character and functional code perforations 15 to cyclically operable sensing pins SP, there being one pin for each of the five positions of the five-unit code. Five sensing contacts SC1 to SC5 inclusive are controlled, respectively, by related pins SP, and are operated in different code combinations in accordance with the code designations sensed on the tape (see also Fig. 18a). The sensing contacts SC1 to SC5 inclusive are connected, respectively, to corresponding translating relays of the group R1 to R5 inclusive (see Fig. 18a), which relays selectively control the operations of the groups of translating relay contacts (Figs. 18b, 18c, and 18d) connected in a fan or cascade arrangement. Selective operations of different code groups of the connected translating relay contacts control the selective energizing of individual distributing relays of the group R21 to R65 inclusive. The distributing relay contacts are connected in a predetermined arrangement to the six individual code wires of the groups CW1 to CW6 inclusive, which wires, in turn, are connected, respectively, to the six-code punch selector magnets of the group SM1 to SM6 inclusive forming a part of the six-unit code perforator 110. The said translating and distributing relays and their associated contacts are effective to translate or convert the code designations sensed in the five-unit code to the six-unit code and accordingly to control selectively the energizing of the code punch selector magnets SM1 to SM6 inclusive.

As will appear more fully hereinafter, upon the selective energizing of one or more of the magnets SM1 to SM6 inclusive and the consequent selection of six code punches CP corresponding, respectively, thereto, the clutch magnet CM of the perforator unit 110 is energized under the control of the continuously rotating shaft 11 and, as a result, a cycle of operation of the code perforator is effected and during each such cycle the code punch, or punches, previously selected are operated to punch in a recording area of the record tape 114, code designating perforations 115 representing the sensed data. During each cycle of operation of the code perforator under the control of the clutch magnet CM, a feed hole punch (not shown) operates to punch a feed hole 116 in the central portions of the six-unit tape 114 and the latter is advanced one space to bring the next blank recording area into recording position.

As will appear more fully hereinafter, a relay cycling means includes a series of relays of the group R6 to R20 inclusive (see Fig. 18e) which are connected so that when code designations are sensed in the five-unit tape 14 representing a carriage return and line spacing operation and a corresponding carriage return designation is recorded in the six-unit tape, the cycling means operates to stop further sensing and spacing of the five-unit tape, and operates under the control of timing cams on the shaft 11 to effect six succeeding controlling cycles of operation of the code perforator, during each of which only the feed hole 116 is punched and the six-unit tape is spaced. At the end of this cycling operation the cycling means automatically restores itself to its normal ineffective or non-operating condition and the normal sensing and spacing of the five-unit tape is resumed. Upon the sensing of a tabulating code designation in the five-unit tape, the cycling means operates in a similar manner to effect the punching of four space holes 116 following the recording of the tabulating code designation in the six-unit tape. As stated previously, the six spaces in the six-unit tape 114 following the carriage return code designation, and the four spaces in the tape following the tabulating code, are calculated to provide sufficient time for a transcribing machine to complete the corresponding functional operation before the next code designation affecting its its operation is sensed.

*Five-unit control tape*

Referring now to Fig. 7, a portion of a five-unit tape 14 is shown provided with successive transverse rows of perforations 15 arranged in accordance with the well-known five-unit telegraphic code, commonly referred to as the Baudot permutative code. In the five-unit permutative code only thirty-two possible permutations are possible and for this reason it is necessary to use the same code combinations to represent alphabet characters, and the numerical and other designation characters. The alphabet characters are designated in Fig. 7 by the legend "Letters case," and the other remaining characters by the legend "Figures case." It is noted that there is no figures case character corresponding to the letter "G." Instead, the "TAB" or tabulating functional code designation is shown as occupying this position. With the exception of this "TAB" code designation, the code combinations representing each functional operation do not represent any other functional operation or any of the characters.

In order to distinguish the alphabetical characters from the other remaining characters, for telegraphic transmission purposes and for the purpose of controlling the operation of certain types of telegraphic printers, the alphabetical character signals or code designations are always preceded by a functional code designation known as a "letter shift" signal or designation, and the other remaining character signals or code designations are always preceded by a functional code designation known as a "figure shift" signal or designation. For example, in the perforated five-unit tape 14 shown in Fig. 8, the indicated code perforations 15 are arranged to designate the following data: "12 barrels 25.00." As noted, the "figure shift" code designation precedes the figures case characters "12" and "25.00" and the "letter shift" code designation precedes the letters case characters "barrels." As the functional code designation representing a tabulating operation also represents the letter "G," the "figure shift" code designation also precedes the "TAB" code designation. When a five-unit tape, such as the one shown in Fig. 8, is used to control the operation of a telegraphic page printer the "letter shift" code signal conditions the printer to print the letters case characters corresponding to the code designations following thereafter, and the "figures shift" signal conditions the printer to print the figures case characters corresponding to the code designation following the "figure shift" signal.

The operation of a transcribing machine to begin a new line of typing is provided for in the Baudot code by two code designations which are the C. R., or carriage return, and the L. F., or line-feed, code designations. As shown in Fig. 8 the L. F. code designation always follows the C. R. designation. The reason for this is that in the conventional type of telegraphic page printer commonly used with the five-unit Baudot code, the returning of the carriage and the line spacing of the platen are two separate machine operations. The C. R. signal, or code designation, effects the return of the carriage and the L. F. signal effects operation of the platen to line-space the work copy. However, as will appear more fully hereinafter, in certain other commercially used transcribing machines, the functional operation to begin a new line of typing is one general operation and requires only one code designation. In the latter machines, the platen is automatically line spaced when the carriage is returned.

Tape sensing unit

Referring now to Figs. 1 and 3, the telegraphic tape 14, provided with the said feed perforations 16 and combinational code perforations 15, is fed from a supply roll 18 under a guide post 19, over a tape guide arm 20, between a pair of separated blocks 21 and 22, over sprocket wheel 23, and under a guide post 24 to a take-up reel 25. Sprocket wheel 23 is provided with the usual centrally located peripheral teeth 27 for engaging the feed perforations 16 and feeding the tape in the direction shown by the arrow in Fig. 3. The sprocket wheel 23 is mounted on a shaft 28, suitably supported by side plate 29 and intermediate plate 30, to which shaft a ratchet wheel 31 is secured. Ratchet wheel 31 is rotated, step by step, by a spring urged pawl 32 (Fig. 2) pivotally mounted on a cam follower arm 33, the latter being secured to shaft 34 (supported by the said side and intermediate plates). Also secured to shaft 34 is a latch arm 35 which when released permits a cam roller 37, carried by the cam follower arm 33, to ride on the periphery of a cam 38 secured to the shaft 11, and follow the contour of the latter. As stated above, the shaft 11 is constantly rotated by the motor 13. The contour of cam 38 is designed so that, upon release of the latch arm 35, the cam follower arm 33 and pawl 32, during rotation of the cam, are partially rotated in a clockwise direction, by means of spring 40, thereby causing the pawl to ride over a tooth of the ratchet wheel 31 and be in a position for advancing the ratchet wheel, one step, when the high point of the cam 38 urges the cam follower arm and pawl in a counterclockwise direction. A fixed plate 41 secured to side plate 29 is provided with a camming surface which is engaged by the free end of pawl 32, as the latter is urged in a counterclockwise direction, thus insuring a positive driving connection between the pawl and the ratchet wheel and also preventing an overdrive of the ratchet wheel. The usual spring urged detent arm 42 is provided, and cooperates with a detent wheel 43 fixed to shaft 28 for maintaining the shaft 28, ratchet wheel 31, and sprocket wheel 23 in the advanced position.

By this described mechanism, the tape 14 is advanced one step, for each cycle of operation of the machine for presenting the next transverse row of code perforations to the sensing elements. A single sensing element, such as sensing pin SP (Fig. 3), having a shouldered recess 45, is provided for each unit of the code. The five individual sensing pins SP are suitably disposed in individual openings formed in the U-shaped guide block 22, and are arranged to cooperate through individual bell cranks 46 with individual sets of sensing contacts of the group SC1 to SC5 inclusive. Each of the sets of sensing contacts is provided with an elongated spring blade which is engaged by an insulated end of one arm of its related bell crank 46, the end of the arm of said related bell crank engaging the related sensing pin. The bell cranks 46 are pivoted on a stud 47 projecting from the plate 29. With the sensing pins in retracted positions, as shown in Fig. 3, the said spring blades are urged sufficiently, to the left, to open their respective contacts.

Figure 2:
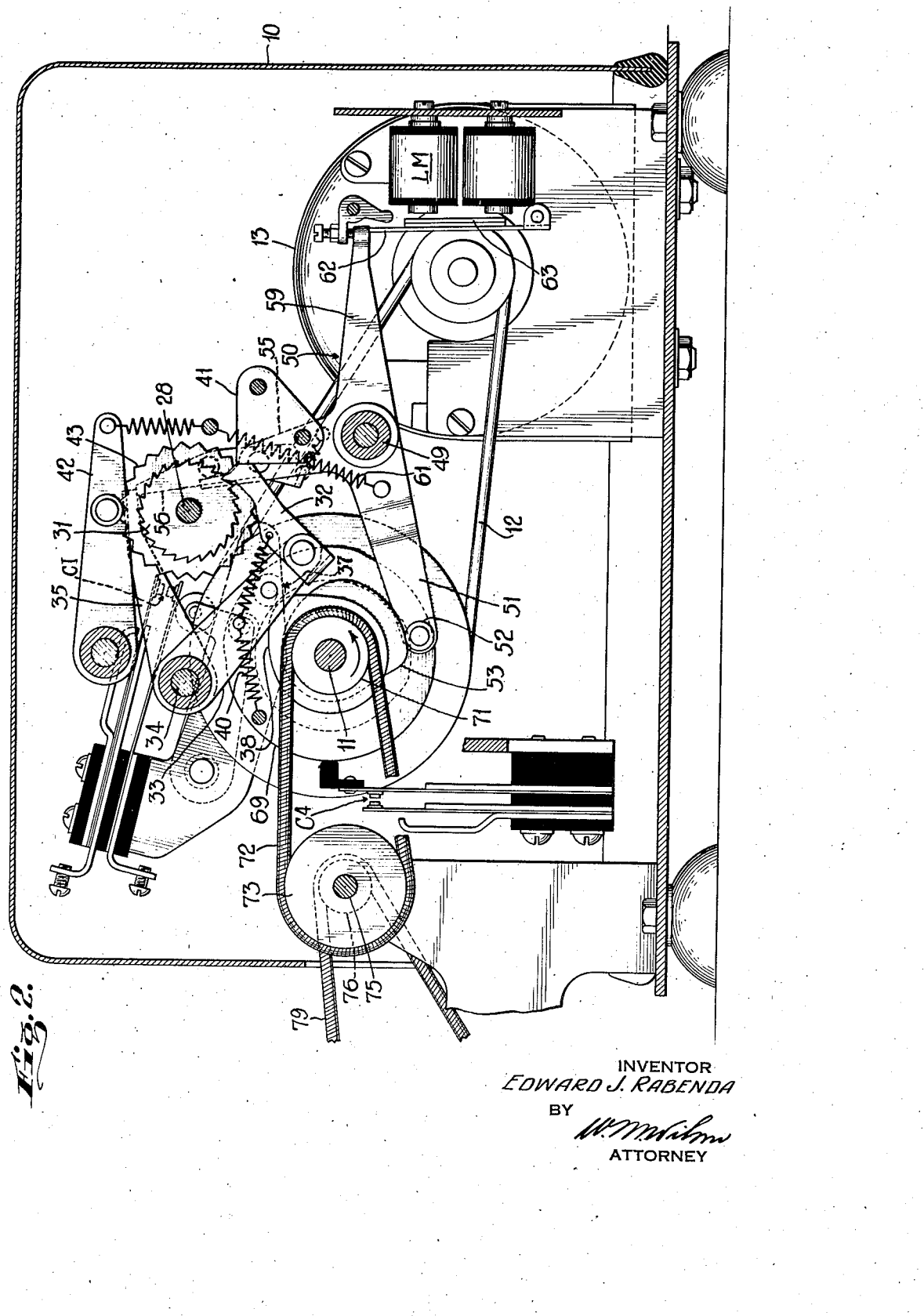
Fig. 2 is a vertical sectional view taken along lines 2—2 of Fig. 1.
Figure 4:
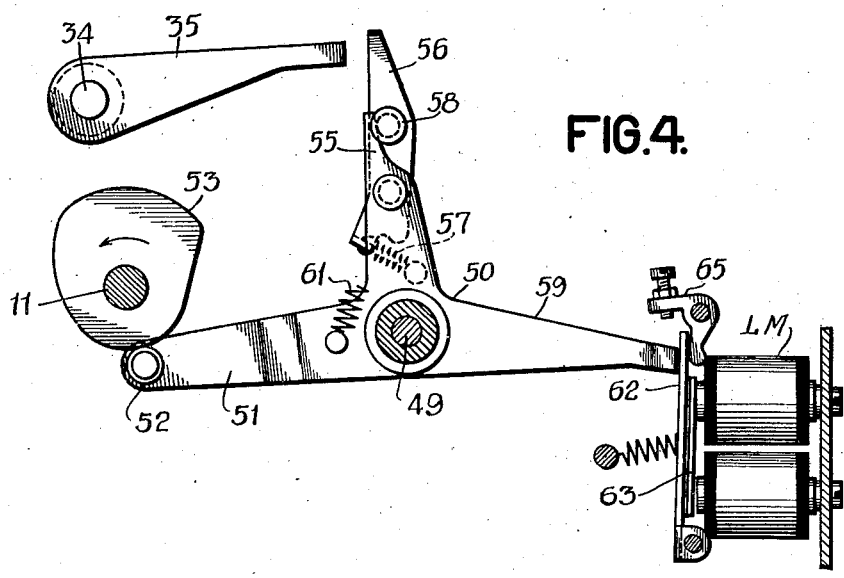
Figs. 4 and 5 are detail views showing different stages of operation of certain elements of the tape reading and spacing means.
Figure 5:
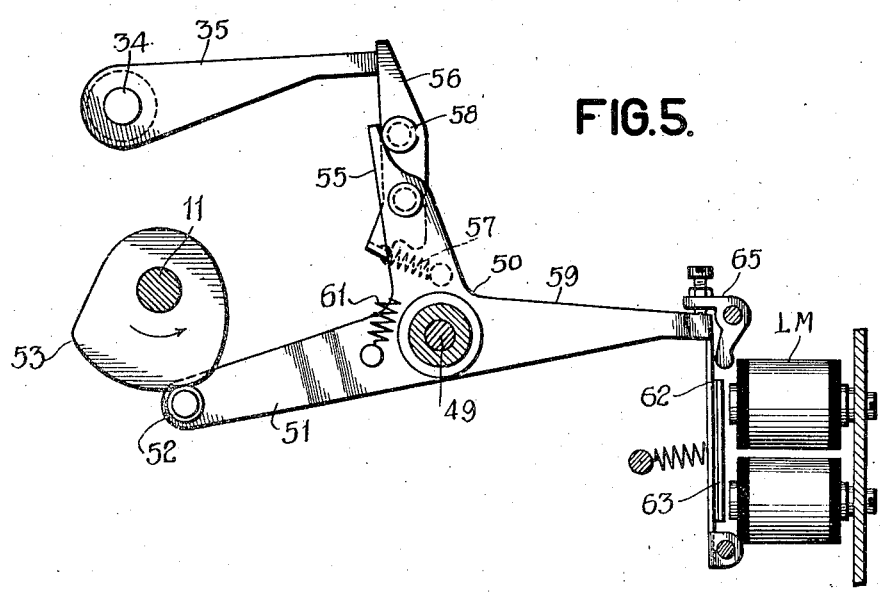

Common to the recesses of all of the sensing pins is a positionable vane or bail 48 secured to shaft 49. Shaft 49 is suitably journaled in side plate 29 and has secured thereto an inverted T or three armed lever 50, the left arm 51 of which, as viewed in Fig. 2, is provided with a cam roller 52 adapted to cooperate with a constantly rotated cam 53. As shown in Figs. 4 and 5, the upright arm 55 of the inverted T lever, carries a pivoted latch lever 56 which is urged, in a counterclockwise direction, by spring 57 so that the stop 58, fixed to the said latch lever, normally engages the upper extremity of the said upright arm 55 of lever 50. The extremity of the right hand arm 59 of lever 50, as viewed in Fig. 2, normally is urged, by spring 61, against the top edge of latch plate 62 secured to the released armature 63 of latch magnet LM, thus latching the said inverted T lever in the normal position shown in Fig. 2. Normally, the latch arm 35 is held in a raised or latched position as shown, by means of the pivoted latch lever 56, thereby maintaining the tape feed pawl 32 in its uppermost or end-of-the-stroke position, as indicated in Fig. 2. With the inverted T lever in the described normal position, the continuous cyclic operations of cams 38 and 53 exercise no controlling effects on the related cam follower arms 33 and 51, respectively. Also, in the same normal position of the inverted T lever, the bail 48 is moved to its extreme position to the left, as viewed in Fig. 3, against the lower shoulders of recesses 45 of the sensing pins SP, thus holding the latter in their retracted positions, and maintaining the associated sensing contacts in normally open positions.

Upon momentary energization of latch magnet LM, its armature is attracted and the latch plate 62 is withdrawn from the arm 59, so that the said lever 50 is unlatched or released, and, under the influence of spring 61, the latter is urged in a clockwise direction (see Fig. 4), causing (1) release of latch arm 35, due to withdrawal of latch lever 56 on arm 52, (2) release of arm 51 and thereby permitting full or effective cooperation between cam 53 and cam roller 52, and (3) release of the sensing pins SP, due to the partial clockwise rotation of bail 48.

Upon release of latch arm 35, cam follower arm 33, during a cyclic operation of cam 38, is partially rotated, first, in a clockwise direction, and then, in a counterclockwise direction to advance the ratchet wheel 31, shaft 28, and sprocket wheel 23, by means of pawl 32, thereby advancing the tape 14, one step, and presenting the next transverse row of code perforations to the sensing pins.

Upon release of the sensing pins SP, the code perforations 15 are detected or sensed by the spring urged pins permitted to pass through the perforations and extend into suitable slots or openings formed in the block 21. The travel of the code groups of pins sensing the perforations is sufficient to permit the related sensing contacts of the group SC1 to SC5 inclusive to be closed. In this manner, code groups of impulses can be initiated in the individual signaling or control circuits connected to the said sets of sensing contacts for suitable controlling purposes, such circuits including, respectively, the translating relays of the group R1 to R5 inclusive.

During a cyclic operation of cam 53, the lever 50 is first partially rotated in a clockwise direction, and then in a counterclockwise direction. When the highest portion of cam 53 is effective, the lever 50 is urged in a counterclockwise direction sufficiently to raise the arm 59 above the released latch plate 62, as shown in Figs. 2 and 5, thereby latching the lever 50 in the normal position. Also during the cyclic operation of cam 53, and upon the partial counterclockwise rotation of lever 50 and shaft 49, the bail 48 is restored to its normal position, during which restoring operation, the shouldered recesses of the displaced sensing pins SP are engaged and withdrawn from the perforations in the tape to restore the said pins and associated contacts to their normal positions. The said sensing pins and contacts are locked in this normal position so long as lever 50 is maintained in the described latched position.

Obviously, the described tape feeding operation must be suppressed until the actual sensing of the code perforations and withdrawal of the sensing pins from the tape are completed. In the instant case, it is preferred to prevent tape feeding until the sensing pins are returned and latched in their normal positions. Accordingly, the cams 38 and 53 are arranged so that the high point of the latter is effective to latch the lever 50, before the high point of the former is effective to cause actuation of the tape feeding pawl 32 (see timing chart Fig. 6). For this reason, the latch lever 56 is arranged to be pivotally disposed on arm 55. After the lever 50 is restored to normal, as shown in Fig. 5, and before the high point of cam 33 is effective to raise the latch arm 35 to its latched position, the pivoted latch lever 56 abuts the end of latch arm 35, and is only restored into latching position by spring 57, when the latch arm 35 is raised over the top of said lever 56. In this manner, tape feed operations are effected after the sensing pins are retracted from the tape, and latched in the said retracted positions. It should also be mentioned that a suitably pivoted restoring lever 65 is provided for positively moving the latch plate 62 to its normal position, when the arm 59 is raised.

As stated previously, the cams 38 and 53 are secured to shaft 11 and consequently are rotated continuously for controlling the sensing and tape feed operations, at such times when the latch magnet LM is energized. Timing control cams 66, 67, 68, and 69 are also fixed to the continuously rotated shaft 11 and control the opening and closing during each cycle of cam contacts C1, C2, C3, and C4, respectively. As will appear more fully hereinafter, the cam contacts C1, C2, C3 and C4 are connected in circuits controlling the cyclic operation of the different elements of the recording apparatus. In addition to the control cams, a suitable frictional drive may be provided for the take-up reel 25, by providing a driving pulley 71 on shaft 11, which pulley is connected by a spring belt 72 to intermediate pulley 73, the latter being secured to suitably supported shaft 75 carrying pulley 76, which in turn is connected to pulley 77 mounted on the take-up reel shaft 78 by spring belt 79.

Referring to Fig. 3, additional circuit controlling means can be provided in the form of contacts 80, which are arranged to be opened, upon exhaustion of the tape supply to the sensing pins SP. The tape guide arm 20 is secured to shaft 81 journaled in the side plate 29, which shaft also carries bell crank lever 82. By means of spring 83, the said bell crank and tape guide arm are normally urged in a clockwise direction so that an insulated pin 84, secured to lever 82, opens contacts 80. This motion, however, is prevented when the supply of tape from roll 18 is not exhausted, due to the tape riding over the guide arm 20 and causing the said guide arm and pin 84 to be held in the positions shown in Fig. 3. An arcuately shaped and slotted tape guide member 85 is also provided to press the tape against the sprocket wheel 23, which member is secured to stud shaft 86 journaled in side plate 29. Also secured to stud shaft 86 is a depending arm 87 arranged to engage the suitably disposed toggle spring 88. The said arm 87 is capable of engaging a pin 89 (secured to lever 82), whenever the guide member 85 is raised manually (for example, during insertion of a new tape), to rotate the bell crank lever 82 and tape guide arm 20 in a counterclockwise direction, thus facilitating tape removal or insertion operations.

In order to insure proper synchronous operations of the described elements, it is preferred to include the cam controlled contacts C3 in the circuit connected to the control or latch magnet LM. In this manner, the latter is always energized to release the lever 50 at a predetermined time during each cyclic rotation of cams 38 and 53, as indicated in the timing chart in Fig. 6. Thus, it is seen, by this provision, that the operated elements are influenced and actuated in the described sequences.

This tape reading unit 10 is of the same general type as is disclosed and claimed in the U. S. patent to Mills and Furman, Patent No. 2,320,788, granted June 1, 1943.

Six-unit record tape

Figs. 9 and 10 show portions of two six-unit tapes 114. In Fig. 9, the code designations representing all characters and those representing functional operations of a transcribing typewriter, are shown as perforated in the tape 114. A legend identifying each code designation appears at the top edge of the tape and in line with the transverse recording area, or field, of the tape containing such code designation. Because there are sixty-four possible code combinations in a six-unit code, each character and functional operation is represented by a separate code designation and consequently the "letter shift" and "figure shift" designations required by the five-unit code are not necessary and are not used in the six-unit code.

The functional operation of the transcribing typewriter to begin a new line of typing is represented in the six-unit code by only one code designation. This is because in the commercial transcribing machine usually operated by the six-unit code tape this is one general operation, the platen being automatically line-spaced when the carriage is returned. This designation is identified in Figs. 9 and 10 as the C. R. or carriage return code designation.

In Fig. 10 the code perforations 115 are arranged to designate the same message in the six-unit code as is designated in Fig. 8 by the code perforations 15 of the five-unit code; viz. "12 barrels 25.00." As stated above, code designations representing "figure shift" and "letter shift" are not used in the six-unit code. It is noted that following the TAB code designation there are four blank transverse recording fields containing only the feed hole perforations 116, and following the C. R., or carriage return, code designation, there are six such blank transverse recording fields. These, as stated above, are automatically provided in the six-unit tape by the recording apparatus of the present invention, and for the useful purpose of giving a transcribing typewriter time enough to perform the function represented by the sensed functional code designation before the next succeeding code designation affecting the operation of the typewriter is sensed.

Code perforator

Those skilled in this art will recognize the six-unit code perforator 110 shown in detail in Figs. 11 to 17 inclusive as being the same as is fully disclosed and claimed in the U. S. patent application of Albert C. Holt, Serial No. 438,973, filed April 15, 1942. A detailed description of the perforator 110 follows.

Figure 12:
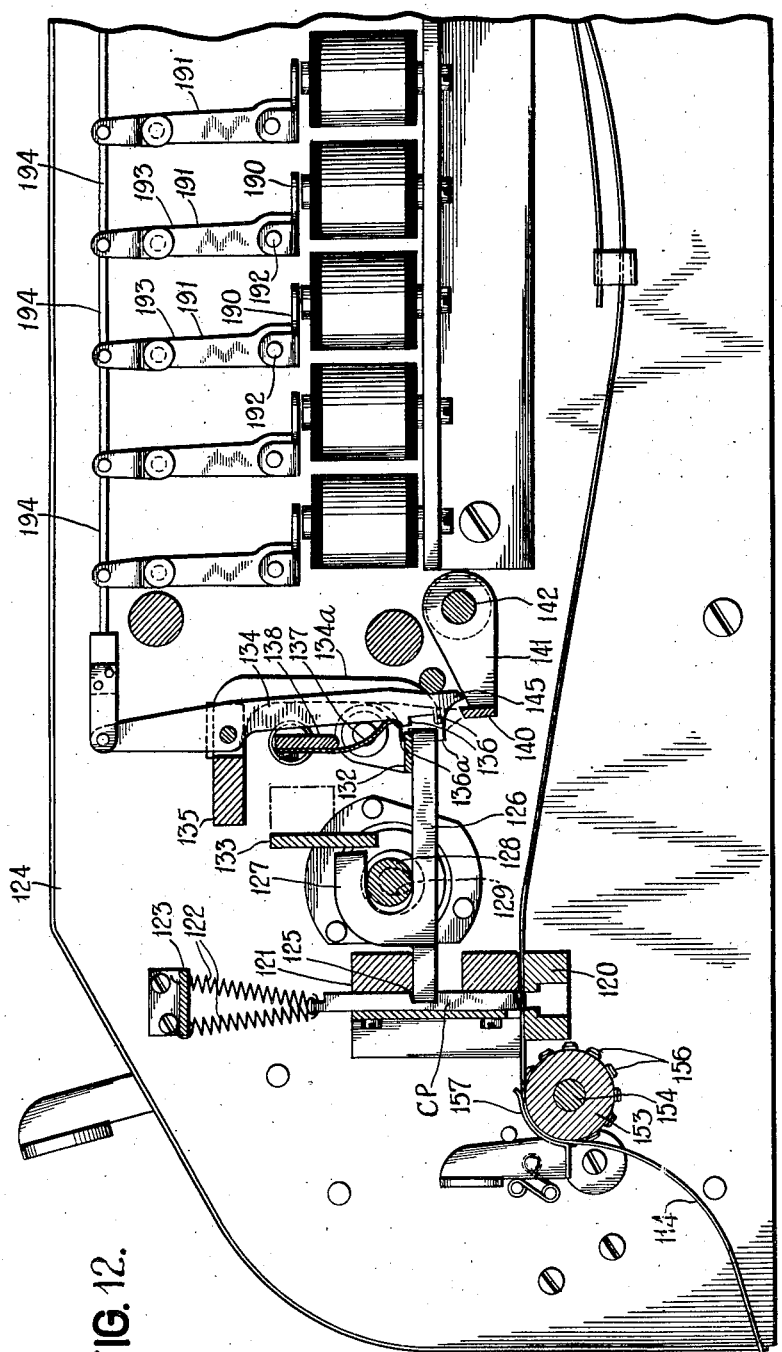
Fig. 12 is a fragmentary vertical sectional view of the perforating unit taken along the lines 12—12 of Fig. 11.

Referring to Figs. 11, 12, and 13, the perforating apparatus 110 is shown to include the individual code punch elements CP, one for each code position, and a common die block 120. The punch elements are slidably arranged in a common punch guide block 121 and are normally held in raised positions by means of individual springs 122. The said springs are supported by a bracket 123 which is suitably secured to side plate 124. The said punch guide and die blocks are also suitably secured to the side plate 124. Each punch element CP is provided with a recess 125, into which recess is placed one end of a positionable interposer 126 having a yoke portion 127. An individual interposer 126 is provided for each punch element CP. An elongated cam or eccentric 128 is carried by, or if desired, formed on shaft 129, which shaft is suitably journaled in the side plate 124 and end plate 130. The eccentric 128 is located within the bows of the yokes 127 of the individual and adjacently arranged interposers 126, to support and actuate or oscillate the said interposers. Normally, during the rotation of the eccentric, the interposers are moved downwardly and upwardly (as viewed in Fig. 12) by the supporting eccentric and about the pivotal connections formed by the ends of the interposers engaging the recesses of the related punch elements. Under these conditions, it is seen, that the free ends of the interposers are partially rotated, first in one direction and then the other direction, or stated in other words, the said free ends of the interposers are oscillated. Suitably disposed stop guides 132 and 133 are provided to maintain proper alignment of the said oscillated interposers.

Individual latch arms 134 are provided, one for each interposer, and are pivotally mounted in a slotted guide block 135 secured to the said side and end plates. Near the lower end of each latch arm, a pair of spaced latching fingers 136 are provided, which fingers are disposed in close proximity to, but normally held out of the path of the movable ends of the interposers by means of a slotted leaf spring 137 secured to a reset bail 138. The bail 138 is rotatably mounted on the said side and end plates, and is elongated sufficiently to permit engagement of the bail with all the latch arms 134. Spring 137 is elongated sufficiently so that the individual slotted sections engage the related latch arms.

In order to selectively operate any code punch element CP, the related latch arm 134 is partially rotated, in a clockwise direction (as viewed in Fig. 12), against the action of the said leaf spring 137, so that its latch fingers 136 engage and latch the free end of the related interposer. It is noted that the shaft 129 carrying the eccentric 128 is not constantly rotated, but operated in a start-stop fashion and that the latch arms 134 are arranged to be selectively positioned to latch the desired interposers before the rotated eccentric displaces or oscillates the said interposers. Thus, upon latching of an interposer 126 and rotation of the eccentric 128, the said interposer is positioned, by the eccentric, about the pivotal connection formed by the related latch arm and the latched end of the interposer, to force the related punch element CP downwardly (in Fig. 12), thereby causing the tape 114, positioned between the said guide and die blocks, to be perforated. The eccentric 128 is shaped so that the lower end, or cutting edge, of the displaced punch element is forced through the paper tape, and then retracted therefrom immediately and restored to the normal position shown in Fig. 12.

Locking means are also provided for holding the displaced latch arm or arms in a latched position, and for preventing displacement of undesired latch arms during the rotation of the eccentric. This means comprises a locking bail 140, which is common to all latch arms 134, and which is suitably secured to an arm 141, which arm 141 in turn is fixed to shaft 142. Shaft 142 is rotatably mounted on said side and end plates, and also has affixed thereto a spring urged cam follower arm 143 (also see Fig. 16), cooperating with cam 144 secured to the start-stop shaft 129. Cam 144 is shaped so that normally (with the shaft 129 at a stop position) the locking bail 140 is held in a position so as to be out of the path of the extension 145 of each latch arm 134. Upon displacement of the desired latch arms in the said latching position, and upon rotation of shaft 129, the follower arm 143 drops from the high portion of the cam 144 to permit the locking bail 140 to be raised in the path of the said latch arm extensions, thereby engaging the said extensions of the displaced latch arms and locking them in the latching position, as shown in dotted outline in Fig. 12. This position of the said locking bail also prevents any faulty displacement of the normally positioned latch arms, since the bail is now effective to engage the extensions of any latch arms which inadvertently might be displaced during the rotation of shaft 129, thereby blocking further clockwise rotation of these latch arms and preventing engagement of the latching fingers 136 and the latching ends of the related interposers 126. The said raised position of locking bail 140 is maintained until near the end of the cycle of rotation of the shaft, when the high portion of cam 144 again engages the follower arm 143 to lower the said bail. Obviously, the bail must be lowered before the latch arms 134 are positively restored by the action of the said reset bail 138.

In practice, it has been found desirable to maintain the locking bail 140 in the raised position from the 11° point to the 280° point in the cycle of rotation of shaft 129. As can be seen from an examination of the time chart of Fig. 6, this period corresponds to a period in the cycle of rotation of the shaft 11 which begins approximately at the 250° point in one cycle of shaft 11 and ends with the 79° point in the next cycle of said shaft 11. As shown, the shaft 129 completes a revolution in about 70% of the time required for shaft 11 to complete a revolution.

For the arrangement shown, it is preferred to render the reset bail 138 operative from approximately the 303° point to the 352° point in a cycle of said shaft 129 (see Fig. 6). The bail 138 is secured to shaft 147 (also see Fig. 13) journaled in the side plate 124, which shaft has affixed thereto a spring urged arm 148 (Fig. 15). Arm 148 is resiliently connected by means of spring 149 to a cam follower arm 150 secured to sleeve 151, which sleeve is loosely mounted on shaft 147. In this manner, follower arm 150 is constantly urged against cam 151 secured to shaft 129. Said cam 151 is effective, near the end of each cycle of rotation of shaft 129 to partially rotate the follower arm 150 and shaft 147 in a counterclockwise direction (Fig. 15) to cause the bail 133 and attached spring 137 to be partially rotated in a counterclockwise direction, as viewed in Fig. 12, to positively urge and restore the latch arms 134 to the normal position out of the path of the latching ends of the related interposers 126.

Suitable means for intermittently advancing the paper tape 114 are provided, which means in the present arrangement are operated near the end of each cycle of rotation of the shaft 129. As shown by the time chart in Fig. 6, the paper tape 114 is fed beginning at approximately the 354° point in a cycle of shaft 129. The paper tape 114 is intermittently fed from a suitable supply roll (not shown) to the punching station by feed roll 153 secured to shaft 154, which shaft is suitably journaled in side plate 124 and a suitable support 155. Said feed roll 153 is provided with centrally located and equally spaced teeth 156 for engaging the centrally located feed perforations 116 in the tape 114. A positionable arcuately shaped tape finger guide 157 is provided to hold the tape against the said feed roll. Shaft 154 has secured thereto a ratchet wheel 158 (also see Fig. 14) which is advanced by a spring urged cooperating pawl 159 pivotally mounted on a suitable cam follower arm 160, which arm cooperates with cam 161. Cam 161 is shaped so as to move the follower arm 160 sufficiently to the right (as viewed in Fig. 14) so that pawl 159 is positioned ahead of one of the teeth of ratchet wheel 158. As shown in Fig. 6, at approximately the 354° point in the cycle of shaft 129, the cam roller 162 drops from the high point of cam 161 permitting the follower arm 160 to be moved towards the left (Fig. 14), by means of spring 163, thereby causing the pawl 159 to engage a tooth of the ratchet wheel 158 and advance it one step, in a counterclockwise direction. Thus, the tape 114 is advanced to present the next blank recording area, or field, to the punching station. Yieldable locking, or detent, means are provided to hold the feed roll 153 in the advanced position, which comprise the cam wheel 164 secured to shaft 154 and the spring urged pivotally mounted detent arm 165 provided with a roller 166 riding on the said cam wheel.

With this type of tape feeding and locking means, it is possible, when desired, to feed the tape in a reverse direction, step by step. Manually operable lever 167 is provided for this reason, and is pivotally mounted on the side frame 124. Lever 167 is connected, by a pin and slot arrangement, to member 168 which is slidably mounted on side plate 124. Member 168 carries a spring urged, pivotally mounted pawl 169 and a camming element 170. Thus, when lever 167 is partially rotated in a clockwise direction, as viewed in Fig. 14, member 168 is raised, causing pawl 169 to engage one of the teeth of cam wheel 164 and position it one step in a clockwise direction, and consequently causing the feed roll 153 to feed the tape one step, in the reverse direction. While the member 168 is being raised, the camming element 170 is effective to engage a bent over portion 171 of the pawl 159 to raise the latter above the ratchet wheel 158 so as to permit the reverse rotation of the said ratchet wheel and feed roll.

From the description up to this point, it is understood that at or before the start of each cycle of rotation of shaft 129, the latch arms 134 are selectively positioned in any desired combination so as to be partially rotated, in a clockwise direction (Fig. 12), in order to latch the free ends of the related interposers 126. Next, the locking bail 140 is operated to engage and lock the displaced latch arms 134 in a latched position, during a major part of the cycle of shaft 129, and to prevent further latching operation by the remaining latch arm or arms during this cycle. Eccentric 128 is then effective to oscillate the latched interposers 126 causing the connected punched elements CP to be operated to perforate the paper tape 114, in accordance with the selected combination of operated punches, while the said tape is at rest at the punching station. Near the end of the cycle of shaft 129, after the punching operation, that is, when the punch elements are withdrawn completely from the paper tape and restored to the normal position shown in Fig. 2, the locking bail 140 is restored to its normal position, and the reset bail 138 is rendered operative to restore the latch arms 134 to their normal positions, thereby releasing the latching ends of the related interposers. The tape feeding mechanism is also rendered operative, near the end of the cycle of shaft 129 to advance the paper one step, thus presenting the next blank recording area of the tape to the said punch elements.

The centrally located feed perforations 116 are not originally provided in the paper tape 114, but are formed therein during each punching operation. For this purpose, a special latch arm 134a (see Figs. 11, 12, and 13) is provided, which is fixedly secured to the slotted guide block 135. This latch arm is also provided with latching fingers 136a similar to latching fingers 136, which fingers 136a constantly grip or engage the latching end of the related interposer 126a, so that, during each punching operation, the said interposer 126a is effective to operate a connected feed hole punch element (not shown) in the same manner as described hereinabove in connection with the code hole punching elements CP. In this way, the centrally located feed perforations 116 are formed in the paper tape. As latch arm 134a is fixed, it is not provided with an extension 145. Also, it is to be noted in Fig. 12, that this special latch arm 134a is arranged and disposed so as not to be engaged by or interfere with the said operation of the reset bail 138 and associated leaf spring 137.

The cyclic, or start-stop, operations of shaft 129 are controlled by a well-known type of electromagnetically controlled, one-revolution clutch indicated generally by the reference character 173. For a detailed description of the clutch mechanism, reference should be made to U. S. Patent No. 2,206,646 granted July 2, 1940. Consequently, the brief description to be given is deemed sufficient for complete comprehension of the present invention. In Figs. 11, 13, and 17, this clutch 173 is shown to comprise an annular member 174 which is secured to shaft 129. A slidable and spring urged dog member 175 is disposed in a suitable channel formed in the said annular member, which dog member is provided with a single tooth 176. A dog lift lever 177 is pivotally mounted in the annular member 174, and is disposed in a suitable channel-way formed in the slidable dog member 175. The free end of the said dog lift lever extends beyond the periphery of the annular member 174 and normally is positioned against a stop 178 formed on the suitably pivoted arm 179, which arm normally is urged by leaf spring 180 so that the said stop 174 is in the path of the dog lift lever 175. With the described elements of the clutch means in this position, the dog lift lever 177 is effective to hold the dog member 175 so that the single tooth 176 formed thereon is out of the path of a ratchet wheel 181, secured to constantly rotated shaft 182, and disposed in close proximity to the annular member 174. Secured to the said pivoted arm 179 is an armature 183 of an associated and suitably disposed clutch magnet CM referred to hereinabove; which armature, upon momentary energization of the clutch magnet CM, positions the stop 178 of arm 179 out of the path of the dog lift lever 177, thereby releasing the latter and permitting the dog member 175 to be positioned so that its tooth 176 engages the ratchet wheel 181. Shaft 182 is constantly rotated by means of motor 185, the shaft of which is connected to shaft 182 by a suitable coupling device 186. In this manner, shaft 129 is rotated. Upon completion of a cycle of rotation of shaft 129, the dog lift lever 177 is urged against the said stop 178 to disconnect the tooth of the dog member from the constantly rotated ratchet wheel 181, thus preventing further rotation of this shaft. Suitable locking means are provided for this described clutch, and comprise a suitably disposed, spring urged pawl 187 cooperating with a suitable notch formed in the flange 188 of the annular member 174.

From the foregoing it will be apparent that each time the clutch magnet CM is energized, the clutch 173 is engaged and the perforator operating shaft 129 is rotated for one complete revolution and then stopped due to the automatic disengagement of the clutch by the stop 178. As explained above, during a revolution of shaft 129, the selected code punches previously selected and the feed hole punch, are operated to perforate the tap 114 and the tape is spaced to bring the next blank recording area into recording position. If no punches have been previously selected and the clutch magnet CM is energized, only a feed hole 116 will be punched and the tape 114 is spaced.

As explained hereinabove at the beginning of the description, the code punches CP are selected by the selective energizing of selector magnets of the group SM1 to SM6, due to the operation of a selected one of the distributor relays of the group R21 to R65 inclusive, and the clutch magnet is energized under the control of the constantly rotating shaft 11. Each selector magnet of the group SM1 to SM6 is provided with an armature 190 forming one arm of a bell crank 191 which is pivoted on a shaft 192 suitably supported by the frame of the perforator. The upper end of another arm 193 of the bell crank 191 of each selector magnet is connected by a link 194 to the upper end of a related latch arm 134. Thus, upon the selective energizing of a selector magnet its armature is operated to move its related latch arm 134 to latch its related interposer and effect operation of its related code punch CP during the following revolution of the shaft 129 which is initiated by the energizing of the magnet CM.

It will be observed that the particular perforator 110 is shown in the drawings is actually provided with seven selector magnets and with seven latch arms 134 and seven interposers 126 controlling related code punches, and that the description only provides for the selective operation of six. As stated above, the perforator 110 is the same one as is disclosed in application Serial No. 438,973. In the present application the number 7 selector magnet is unused because the tape 114 is being perforated in accordance with a predetermined six-unit code; the six code wires CW1 to CW6 being connected, respectively, to the magnet SM1 to SM6, inclusive. Obviously, the seventh selector magnet with its related latch arm 134, interposer 126 and code punch CP can be used when it is desired to perforate a tape in a seven-unit code.

Operation

The operation of the recording apparatus disclosed will now be explained in connection with the timing chart shown in Fig. 6 and the circuit diagram included in Figs. 18a to 18e.

As shown in Fig. 6, cam contacts C2; which, as explained hereinabove, are operated by the cam 67 on the continuously rotating control shaft 11; are termed the analyzing cam contacts and is indicated as closing at approximately 45° in a cycle of rotation of shaft 11 and opening at approximately 207°. The cam contacts C1 operated by cam 66, are termed the distributing cam contacts and close at approximately 98° and open at approximately 204° of a cycle of shaft 11. The cam contacts C4 operated by cam 69, are termed the clutch control cam contacts and close at about 120° and open at about 225° of a cycle of shaft 11. The cam contacts C3 operated by cam 68, are termed the latch control cam contacts and close at 333° in one cycle of shaft 11 and open at 18° in the next cycle. Feed cam 38 will feed the tape 14, starting at about 320° of one cycle and ending at the high point of the cam at 360°. The cam 53 provides for controlling the sensing pins to close their related sensing contacts at about 33° and to open their contacts at about 246°.

In Figs. 18a to 18e the elements are shown in the positions occupied when the recording apparatus is idle and with the shaft 11 at the 0° position occupied at the beginning of a cycle.

Figure 18A:
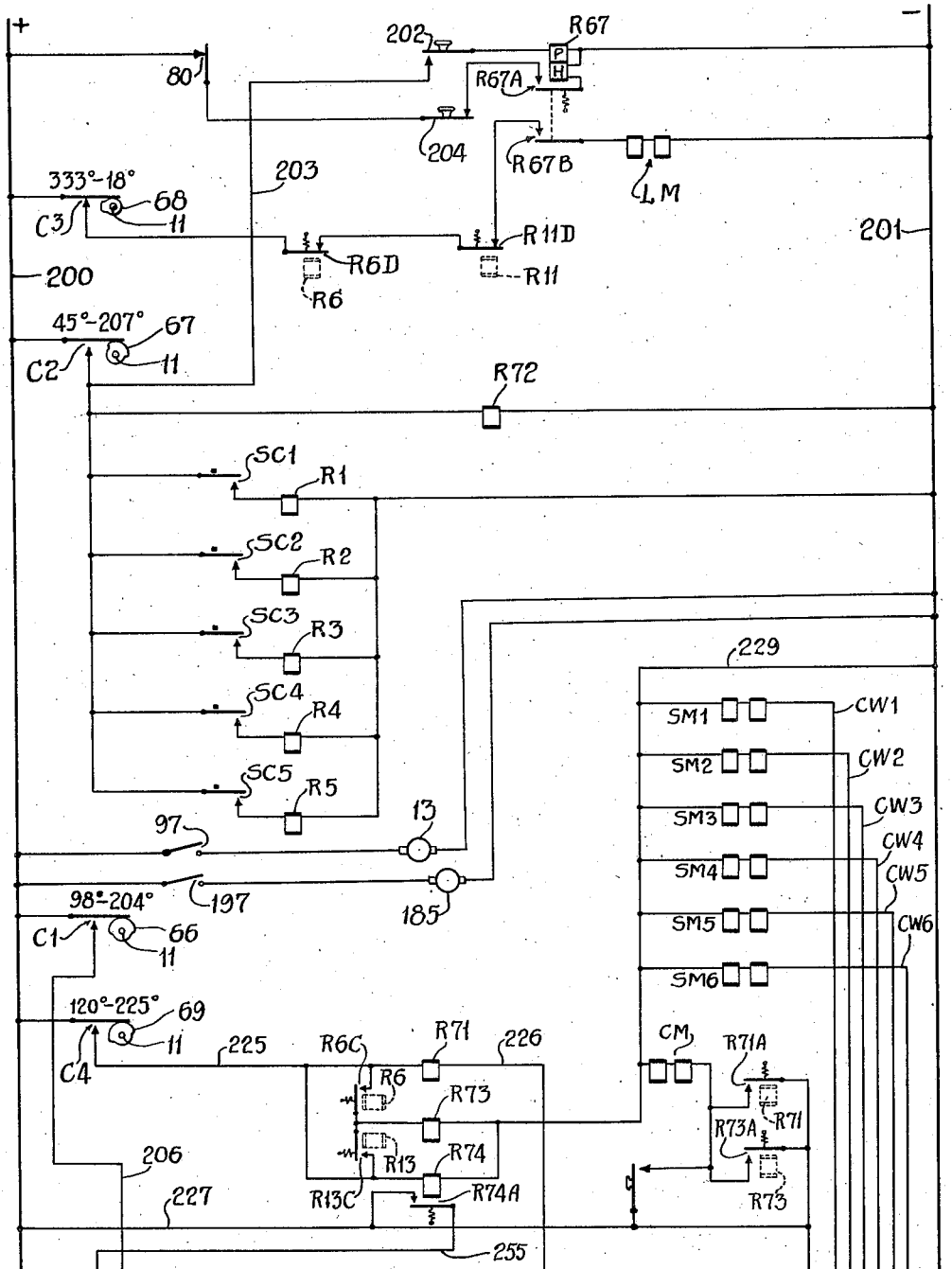

To start operation, the manual switch 97 is closed to connect the controlling motor 13 across the electrical power source indicated by the positive wire 200 and the negative wire 201 (see Fig. 18a). The switch 197 is also closed to start the perforator motor 185. A control tape 14 is properly inserted in the unit 10 and a blank recording tape 114 in the perforator 110. Assume that the inserted control tape 14 bears the same illustrative message as the tape shown in Fig. 8.

Recording operation is initiated by depressing the start key 202 which conditions a start circuit traceable as follows: from position wire 200, analyzing cam contacts C2, conductor 203, start key 202, the pick up coil of start relay R67 to the negative conductor 201. Thus, with key 202 closed and at the 45° in a cycle of shaft 11 when contacts C2 close, relay 67 will be picked up, thereby closing its hold contacts R67A and its latch circuit control contacts R67B. Closed contacts R67A establish a holding circuit through the hold coil of R67 which is traced as follows: conductor 200, the closed tape control contacts 80, normally closed stop contacts 204, contacts R67A, hold coil of relay R67 to the conductor 201. Contacts R67B condition an energizing circuit for the latch magnet LM which is traced as follows: conductor 200, latch control cam contacts C3, normally closed relay contacts R6D, normally closed relay contacts R11D, now closed contacts R67B, and the latch magnet LM to the conductor 201. When the cam contacts C3 close at 333° of the cycle, the circuit just traced is closed to energize the latch magnet LM thereby starting the successive cyclic sensing and feeding of the control tape 14 as described hereinabove.

The sensing pins SP contact the field of the tape 14 which is in sensing position, at about 21°, and those sensing pins which correspond to the code positions having perforations 15 therein, pass through the perforations and effect closing of their related sensing contacts of the group SC1 to SC5 inclusive. As the first code designation in the tape being sensed is the one representing figures shift which, as shown in Figs. 7 and 8, is a combination of perforations 15 in the code positions 1, 2, 4, and 5, sensing pins SP corresponding to the code positions 1, 2, 4, and 5 pass through the tape and effect closing of their related sensing contacts SC1, SC2, SC4, and SC5. The sensing contacts close at 33° of the cycle of shaft 11 and condition the energizing circuits for their related translating relays R1, R2, R4, and R5, which energizing circuits include the analyzing cam contacts C2.

Figure 18B:
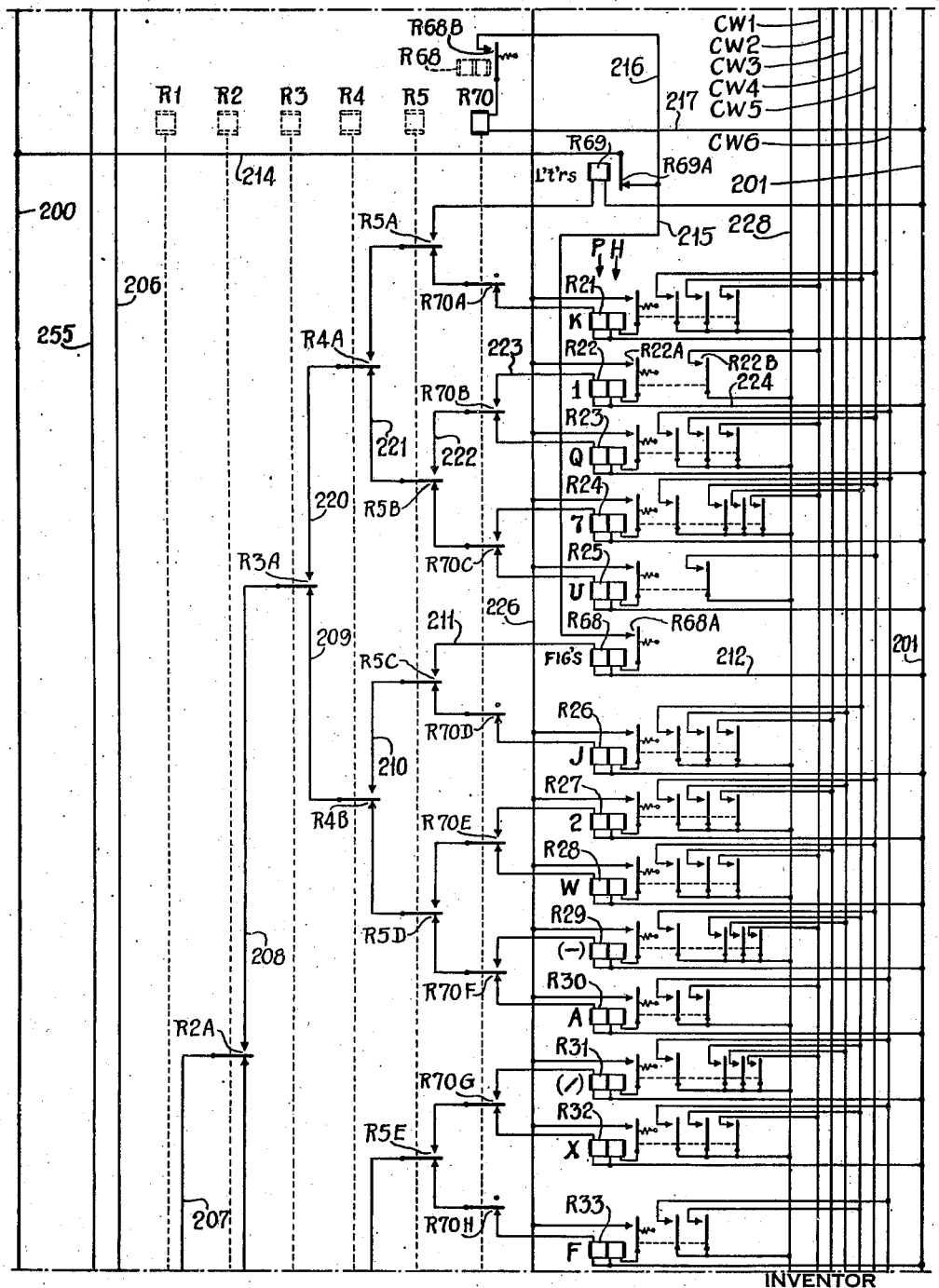
Figure 18C:
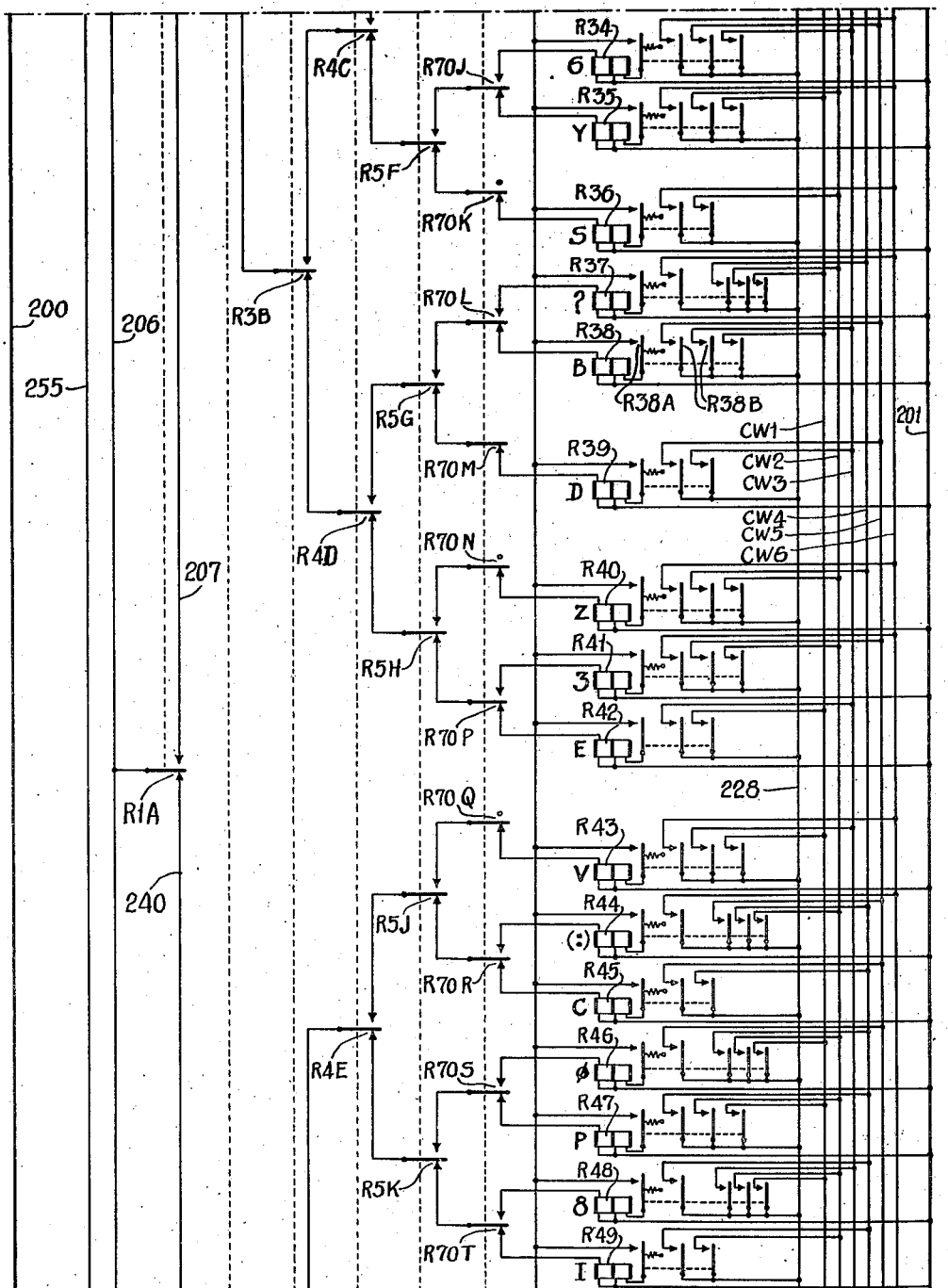
Figure 18D:
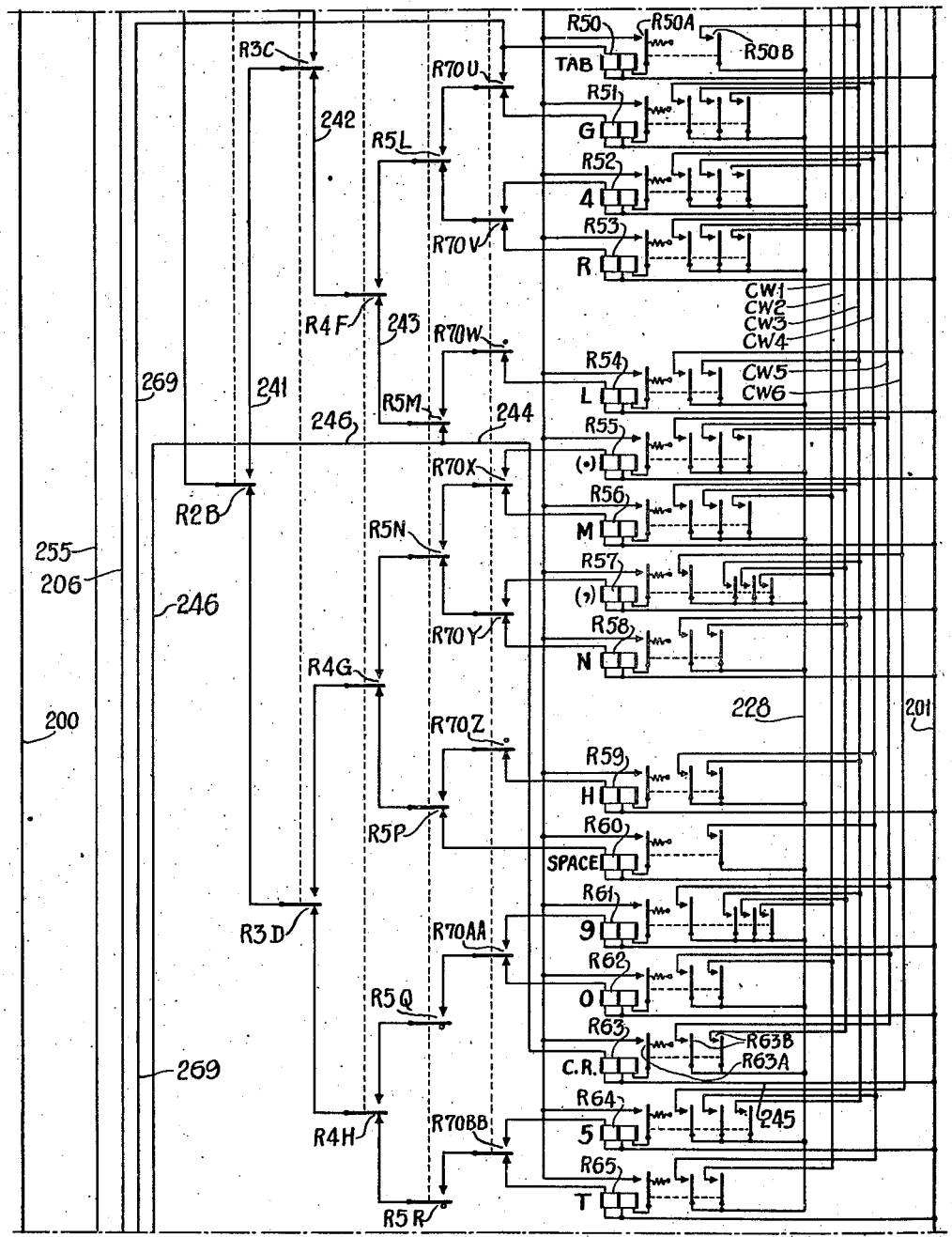

Analyzing cam contacts C2 close at 45° and thereby close the above mentioned circuits to energize the translating relays R1, R2, R4, and R5, which results in the shifting of their respective relay transfer contacts R1A, R2A and R2B, R4A to R4H, and R5A to R5R, from their normal lower positions shown in Figs. 18b, 18c, and 18d to their upper position. The shifting of these translating relay transfer contacts conditions a translating circuit including the pick up coil of figures relay R68 (Fig. 18b) which is traceable as follows: from the positive conductor 200, distributing cam contact C1, conductor 206, translating relay contacts R1A in the shifted position, conductor 207, translating relay contacts R2A in the shifted position, conductor 208, translating relay contacts R3A in the position shown, conductor 209, translating relay contact R4B in the shifted position, conductor 210, translating relay contacts R5C in the shifted position, conductor 211, the pick up coil of relay R68 and conductor 212 to the negative conductor 201. It is noted that in the figures relay R68 and in each of the distributing relays of the group R21 to R65 inclusive which appear in Figs. 18b, 18c, and 18d, the pick up coil thereof is shown at the left and the hold coil thereof at the right.

Thus, when the distributing cam contacts C1 closes at 98° in the cycle of shaft 11 the just traced translating circuit is closed to energize the figures relay R68 which closes its hold contacts R68A and its contacts R68B. Closed contacts R68A close the holding circuit for relay R68 which can be traced as follows: from positive conductor 200, conductor 214, normally closed letters relay contact R69B, conductor 215, now closed hold contacts R68A, the hold coil of relay R68, and conductor 212 to the negative conductor 201. Relay contacts R68B when closed establish an energizing circuit for figures supervisory relay R70 which is traced as follows: from positive conductor 200, conductor 214, closed contact R69A, conductor 216, now closed contacts R68B, figures supervisory relay R70, and conductor 217 to the negative conductor 201. Relay R70 when thus energized shifts its relay transfer contacts R70A to R70BB from their normal lower position shown in Figs. 18b, 18c, and 18d, to their upper position.

It is noted at this point that when supervisory relay R70 is energized in the manner just explained, it is held through normally closed letters relay contacts R69A and relay R70 will remain energized and the related transfer contacts will remain in their shifted upper position until the letters relay R69 is energized in response to the sensing of a letter shift code designation in the control tape 14. Upon the energizing of letters relay R69 its contacts R69A open to break both the holding circuit for figures relay R68 and also the circuit for supervisory relay R70 which were traced above. This will result in the relay contacts R70A to R70BB being returned to their normal lower position shown in the drawings.

As explained hereinabove, the operation of the perforator is effected by the energizing of the clutch magnet CM. As shown in Fig. 18a, the clutch magnet CM can be energized by the closing of either relay contacts R71A or relay contacts R73A. Either of these sets of contacts connect the clutch magnet across the power line through conductor 227, which is connected to positive conductor 200, and conductor 229 which is connected to the negative conductor 201. Clutch control relay R71 is energized by a circuit which includes the hold or "A" contacts of either of the distributing relays R21 to R65 and is closed by cam contacts C4 at 120° of shaft 11. Clutch control relay R73 is energized by a circuit which includes either relay contacts R6C or R13C and is also closed by cam contacts C4 at 120°. Thus, the clutch magnet CM is energized as a result of the closing of cam contacts C4 at 120° only when one of the distributing relays of the group R21 to R65 or when relays R6 or R13 have been previously energized during each cycle.

During this cycle of the recording apparatus now being described, when the figure shift code designation is sensed, the closing of clutch control cam contact C4 at 120° will have no effect on the operation of the clutch CM in the perforator 110, because, as just stated, neither one of the distributing relays of the group R21 to R65 inclusive and neither relays R6 nor R11 have been previously energized during this cycle. Consequently, the code perforator 110 will not be operated.

However, during the latter part of this cycle being described, at about 320°, the feed cam 38 advances the control tape 14 to place the next succeeding code designation in position to be sensed by the sensing pins during the next cycle. Also at 333° of this cycle the latch control cam contacts C3 close again to energize latch magnet LM in the manner previously described.

During the next succeeding cycle, the sensing pins beginning at 21° sense the code designation for the numeral "1" which as shown in Fig. 8 comprises perforations 15 in the 1, 2, 3, and 5 code positions. In the manner described above, the sensing contacts SC1, SC2, SC3, and SC5 will close at 33°; and, when the analyzing cam contacts C2 close at 45°, the related translating relays R1, R2, R3, and R5 will close and shift their respective transfer contacts to condition a translating circuit through the pick up coil of distributing relay R22 which circuit will be closed at 98° by the distributing cam contacts C1. This translating circuit can be traced as follows: positive conductor 200, distributing cam contacts C1, conductor 206, translating relay contacts R1A in shifted position, conductor 207, translating relay contacts R2A in shifted position, conductor 208, translating relay contact R3A in shifted position, conductor 220, translating relay contact R4A in the position shown, conductor 221, translating relays contacts R5B in the shifted position, conductor 222, supervisory relay contacts R70B in their shifted position, conductor 223, pick up coil of distributing relay R22, conductor 224 to the negative conductor 201. Upon being energized, relay R22 closes its hold contacts R22A and its code contact R22B. The closing of contacts R22A conditions a circuit through the clutch control relay 71 and through the hold coil of R22 which circuit is traceable as follows: positive conductor 200, clutch control cam contacts C4, conductor 225, clutch magnet control relay R71, conductor 226, closed relay contacts R22A, hold coil of relay R22 and conductor 224 to the negative conductor 201. The closing of distributing relay contacts R22B establishes immediately a code selecting circuit traceable as follows: from positive conductor 200, conductor 227, conductor 228, now closed code contacts R22B, code wire CW1, selector magnet SM1, and conductor 229 to negative conductor 201. The establishing of this circuit results in the selector magnet SM1 being energized and, as described hereinabove, in the consequent selection of its related latch lever 134, interposer 126 and code punch CP (see Fig. 12).

With hold contacts R22A closed and when clutch control cam contacts C4 close at 120°, the hold coil for relay R22 is energized and also clutch magnet control relay R71 is energized. Relay 71, upon being energized, closes its contacts R71A to establish the circuit through the clutch magnet CM traced hereinabove. As explained above, when the clutch magnet CM closes, the perforator 110 begins a cycle of operation during which the previously selected code punch or code punches perforate the record tape 114 in the corresponding code positions. Consequently, during the cycle of operation of the recording apparatus just described, wherein the code designation for the numeral "1" was sensed in tape 14 and the selector magnet SM1 energized, a code perforation 115 will be punched in the number "1" code position of the six-unit record tape 114.

As can be seen from examination of the timing chart in Fig. 6, the six-unit code perforator 110 begins a cycle of operation at about 243° in the cycle of operation of shaft 11 and completes its operation at about 135° in the next succeeding cycle of shaft 11. During the period between 135° and 243° in the cycle of shaft 11, the code perforator 110 is not operating and it is during this idle period that the above-described selective energizing of the code selector magnets of the group SM1 to SM6 is effected.

During the latter part of this second cycle of shaft 11 being described, the tape 14 is spaced by the cam 30 and pawl 32. Also, at 333° cam contacts C3 are closed to energize latch magnet LM in the manner explained previously.

From the foregoing, it will be apparent how during the next succeeding, or third cycle, of operation of the recording apparatus, the code designation for the numeral "2" will be sensed in the five-unit control tape 14 and how such code designation will be converted by the relay translator and the code designation for the numeral "2" in the six-unit code will be recorded in the record tape 114. The tape 14 will be again spaced and the latch magnet LM energized as before.

During the next or fourth cycle of operation of the recording apparatus, the letter shift code designation will be sensed which, will result, when analyzing cam contacts C2 close at 45° of shaft 11, in the energizing of all five translating relays R1 to R5 inclusive and in the conditioning of a translating circuit including letters relay R69. Thus, when the distributing cam contacts C1 close at 98°, the conditioned translating circuit will be established energizing the letters relay R69. As explained above, R69 will open its contacts R69B and thereby drop out the holding circuit of figures relay R68 and the supervisory relay R70, and the supervisory relay contacts R70A to R70BB will shift to their normal lower position shown in the drawings. As none of the distributing relays R21 to R65 and as neither relay R8 nor R11 are energized, the clutch magnet CM, cannot be energized and the perforator 110 consequently does not go through an operating cycle during this fourth cycle of shaft 11. However, the tape 14 is spaced and the latch magnet energized, as before.

With the transfer contacts of supervisory relay R70 in their normal lower position, the sensing in the control tape 14 of the code hole combination 1, 4, and 5 during the next or fifth cycle, will result in the energizing of translating relays R1, R4, and R5 and in the shifting of their related transfer contacts to condition a translating circuit including the pick up coil of distributing relay R38 which corresponds to the letter "B." When distributing cam contact C1 closes at 98°, the distributing relay R38 will be energized and will close its hold contacts R38A and its code selector contacts R38B. The closing of contacts R38B immediately energizes selector magnet SM1, SM3, and SM5, through related code wires CW1, CW3, and CW5. Thus, in the manner explained above, when clutch control cam contacts C4 close at 120° the hold circuit for distributing relay R38 will be established through its contacts R38A and the clutch control relay R71 will be energized. Relay R71 will close its contacts R71A and thereby cause the clutch magnet CM to be energized, by the circuit previously traced, and effect an operation of the perforator, during which the code punches previously selected will punch perforations in the number 1, 3, and 5 code positions of the tape 114. The latter is the code combination for the letter "B" in the six-unit code (see Figs. 9 and 10).

From the foregoing, it will be apparent how during succeeding cycles, the code designations for the remaining letter and figure characters in the control tape 14 are sensed, converted, and corresponding code designations recorded in the six-unit record tape 114. The operation which takes place upon the sensing of the TAB, C. R., and L. F. code designations will now be described in connection with the cycling control apparatus.

*Cycling control apparatus*

In accordance with the present invention, when the recording apparatus senses either of certain predetermined code designations in the five-unit control tape 14 which represent functional operations of a transcribing machine requiring a relatively long period of time for their completion, each such sensed designation is converted by the translator into a corresponding code designation in the six-unit code and the latter designation is recorded in the six-unit record tape 114. During the same cycle of shaft 11 in which the just-mentioned sensing, converting and recording operation took place and in response to the sensing of such designation, a cycling control apparatus is rendered effective to stop further sensing and spacing of the control tape and effective to operate in a predetermined number of steps, which number is determined by the particular code designation sensed. The first of said operating steps is effected during the cycle of shaft 11 when the aforementioned sensing, converting, and recording takes place and the remaining of said operating steps are effected, respectively, during succeeding cycles of shaft 11, and during each of such succeeding cycles the cycling control apparatus provides for the energizing of clutch magnet CM of the perforator 110 to effect the punching of a feed perforation 116 in the tape 114 and to effect spacing of tape 114 to bring the next blank recording area into recording position. Upon the completion of the predetermined number of operating steps of the cycling control apparatus, the latter is automatically restored to its normal ineffective condition and the control tape sensing and spacing means is restored to its normal operating condition.

In the recording apparatus disclosed, the two predetermined functional code designations mentioned above which initiate operation of the cycling control apparatus are (1) a code designation representing an operation of the transcribing typewriter to begin a new line of typing and (2) a code designation representing a tabulating operation of the typewriter carriage.

As the operation of the transcribing machine to begin a new line of typing is represented in the five-unit Baudot code by a combination of the C. R. and L. F. code designations, as this operation is represented in the six-unit code by the single C. R. code designation, and as only one code designation or signal in the five-unit tape is required to effect the above mentioned operation of the relay translator and perforator to convert and record a corresponding code designation in the six-unit code; it is believed less confusing and more simple to consider the code designation used to control this operation of the recording apparatus as the "new line" code designation and to consider the corresponding code designation recorded in the six-unit tape 114 also as a "new line" code designation.

Figure 18E:
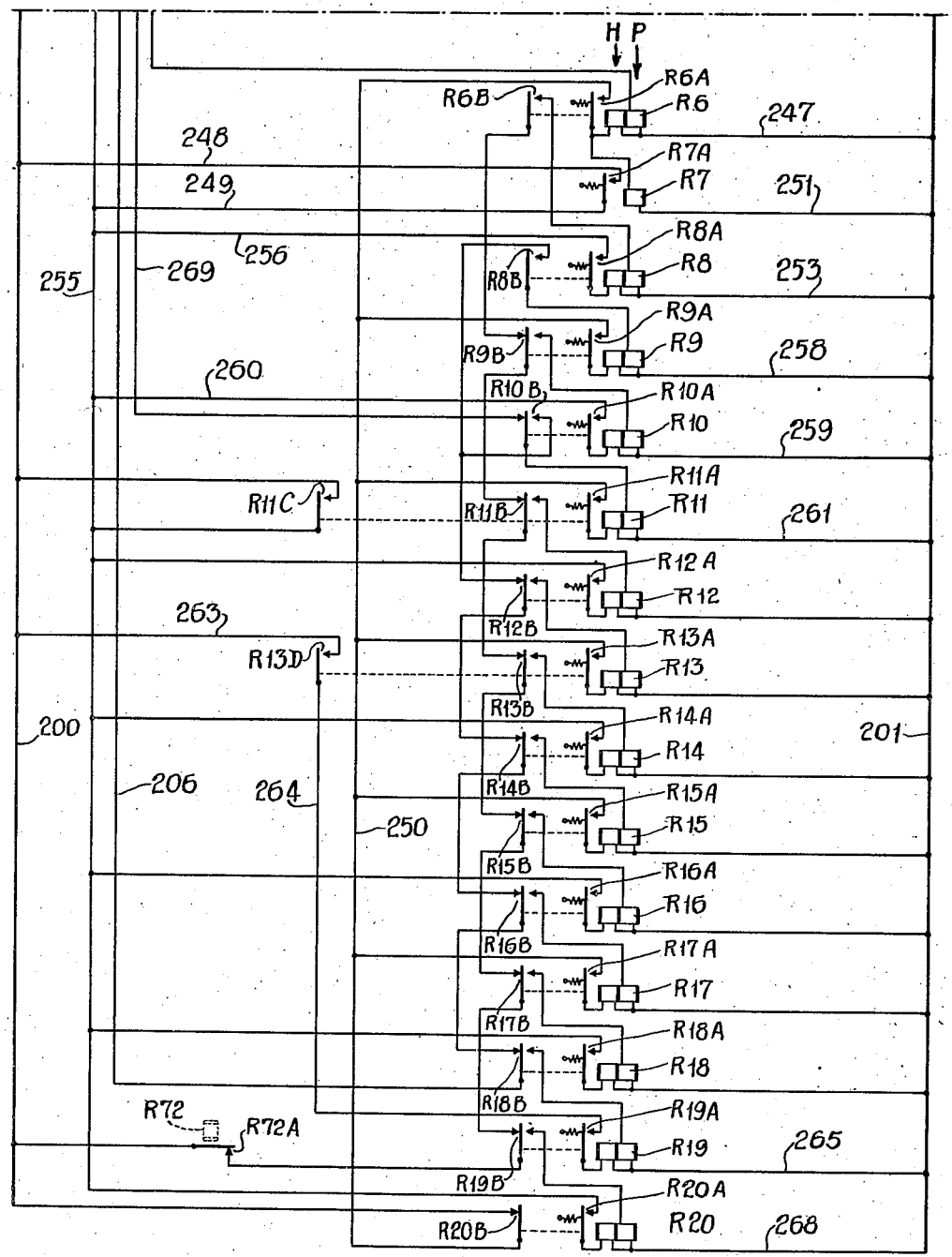

The cycling control apparatus is disclosed in the circuit diagram shown in Figs. 18a to 18e, inclusive, and comprises the shaft 11 operating continuously in recurring cycles with its cams 66, 67, and 69 and the cam contacts C1, C3, and C4, operated thereby; the cycling relays of the group R6 to R20 inclusive shown in Fig. 18e; timing relay R72 (see Fig. 18a); relay R74; the clutch magnet control relay R73; and the circuit wires connecting said cam contacts, said relays and the contacts controlled thereby.

As will appear more fully hereinafter, the cycling relays R6 to R20 are grouped in an operating sense to provide in effect a plurality of relay control units corresponding in number to the maximum number of operating steps of the cycling control apparatus which will be required. The relay control units are adapted to be energized in a prescribed serial order during succeeding operating cycles of shaft 11 and the energizing of each relay control unit comprises an operating step of the cycling apparatus. Each relay control unit comprises first and second companion relays and the first companion relay of each relay control unit is energized during the first part of its respective cycle of shaft 11 and conditions an energizing circuit for the second companion relay of such unit and the latter is energized during a later part of its respective cycle. When each second companion relay of each relay control unit, except the last of the series, is energized, it conditions the energizing circuit for the first relay of the next control unit in the series and the latter energizing circuit is closed during the next succeeding cycle of shaft 11. When the second companion relay of the last unit of the series is energized, it provides for restoring the cycling control apparatus to its normal ineffective condition and in the restoring of the recording apparatus as a whole to its normal operating condition. It is believed that the cycling control apparatus can best be understood by first describing in detail the operation which takes place upon the sensing of one of the two predetermined functional code designations referred to above.

As stated above, the "new line" designation, in the five-unit tape 14, used herein to initiate operation of the cycling control apparatus and to record a corresponding "new line" designation in the six-unit tape, is the L. F. designation appearing in Figs. 7 and 8. It will be noted, however, that either the L. F. or C. R. designation in tape 14 could be used for this purpose. In the recording apparatus disclosed, the sensing of a C. R. designation has no affect on the perforator 110. The C. R. designation in tape 14 comprises a code perforation in the number 4 code position and when sensed, the sensing contacts SC4 are closed at 33° and to condition an energizing circuit for translated relay R4 which is closed at 45° when analyzing cam contacts C2 close. Relay R4 shifts its relay transfer contacts but a translating circuit to a distributing relay of the group R21 to R65 inclusive is not conditioned thereby. From an examination of Figs. 18a, 18b, 18c, and 18d, it is noted that with only the transfer contacts of translating relay R4 shifted, the potential translating circuit is open at translating relay contacts R5Q. As no distributing relays are energized and as contacts R6C and R13C are open, clutch magnet control relays R71 or R73 cannot be energized at 120° of shaft 11 when cam contacts C4 close. Hence, magnet CM is not energized and the perforator 110 is not operated. However, the tape 14 is spaced to bring the next record field into sensing position, and latch magnet LM is again energized at 333° when cam contacts C3 close. As the L. F. code designation in the five-unit code always follows the C. R. designation, the just described operations will bring the L. F. designation into sensing position.

As shown in Fig. 8, the L. F. code designation, defined hereinabove as the controlling "new line" designation, comprises a code perforation 15 in the number 2 code position. With the L. F. code designation in sensing position, the sensing contacts SC2 will close at 33° of the next cycle of shaft 11 and the translating relay R2 will be energized when analyzing cam contacts C2 close at 45°. Translating relay R2 will shift its transfer contacts and thereby condition a translating circuit path through distributing relay R63 and the latter circuit will be closed at 98° by distributing cam contacts C1. This latter circuit is traced as follows: from positive conductor 200, cam contacts C1, conductor 206, translating relay contacts R1A in the position shown, conductor 240, translating relay contacts R2B in the shifted position, conductor 241, translating relay contacts R3c as shown, conductor 242, relay contacts R4F as shown, conductor 243, relay contacts R5M as shown, conductor 244, pick up coil of distributing relay R63, and conductor 245 to the negative conductor 201. When relay R63 is thus energized, its hold contacts R63A and code contacts R63B close.

Closed contacts R63A condition a circuit path through the hold coil of R63 which, as explained, includes the clutch control relay R71 and the conductors 225 and 226. This conditioned circuit path will be closed at 120° by clutch control cam contacts C4.

Immediately upon the energizing of relay R63 and the closing of its code contacts R63B, selector magnets SM2 and SM5 are energized by a circuit traced as follows: from positive conductor 200, conductor 227, conductor 228, code contacts R63B now closed, code wires CW2 and CW5, selector magnets SM2 and SM5, and conductor 229 to the negative conductor 201. Thus, when cam contacts C4 close at 120° to energize the clutch control relay R71 which closes its contacts R71A to establish the energizing circuit for clutch magnet CM, the energizing of clutch magnet CM will result in the initiating of a cycle of operation of the perforator unit 110 and during such cycle code perforations will be punched by the previously selected code punches in the number 2 and number 5 code positions in the six-unit tape 114. As shown in Figs. 9 and 10, perforations in these code positions represent the C. R. code designation in the six-unit code.

During this same cycle of shaft 11 being described and concurrently with the energizing of distributing relay R63 at 98°, cycling relay R6 (see Fig. 18e) is energized through a branch parallel circuit extending from translating relay contacts R5M through a conductor 246, the pick up coil of relay R6, and the conductor 247 to the negative conductor 201.

It is noted at this point that in each of the cycling relays shown in Fig. 18e and identified by the numerals R6 to R20 inclusive, the pick up coil of each such relay is at the right and the holding coil at the left. This arrangement is opposite to the arrangement of the pick up and holding coils of distributing relays R21 to R65 inclusive, previously described.

The energizing of relay R6 initiates the operation of the cycling control apparatus. Relays R6, R7, and R8 may be considered as being companion relays comprising the first of the series of relay control units, referred to hereinabove, and all of the relays R6, R7, and R8 are energized and held energized during the cycle of shaft 11 when the C. R. code designation is punched in the tape 114. The relay R6 is the first companion relay of this first unit to be energized and, as stated, such relay was energized through contacts C1 at 98°.

Relay R6, when energized, closes its contacts R6A, R6B and R6C and opens its contacts R6D. Closed contacts R6A establish a circuit through the holding coil of relay R6 as follows: from conductor 200, normally closed relay contacts R20B, conductor 250, contacts R6A now closed, hold coil of relay R6, and conductor 247 to negative conductor 201. Relay contacts R6A also establish a branch parallel circuit extending from conductor 250 and through relay R7 and conductor 251 to the negative conductor 201. As will be readily understood by those skilled in this art, the relay R7 is provided so that the coil of relay R6 will not be overloaded by operating too many contacts. As relay R7 is energized and held by the holding contacts of R6, the two relays may be considered functionally as being one.

Relay R7 closes its contacts R7A to condition a holding circuit for cycling relays to be energized later in the operation. This is effected through conductor 248 which is connected to positive conductor 200 and conductor 249 which is connected to a hold circuit conductor 255.

Closed relay contacts R6C (see Fig. 18a) condition the energizing circuit for clutch control relay 73 which circuit is closed when clutch control cam contacts C4 close at 120°, as explained hereinabove. As shown, the conditioned circuit includes positive conductor 200, cam contacts C4, conductor 225, contacts R6C, clutch control relay R73, conductor 229, and negative conductor 201. During this first cycle of the cycling control apparatus the energizing of relay R73 will have no additional affect on the operation because, as previously explained, the circuit through clutch control relay R71 is also conditioned by the energizing of distributing relay R63 and closing of contacts R63A. Consequently, relay R71 is energized simultaneously with relay R73, when contacts C4 close, and both contacts R71A and R73A will close the energizing circuit for the clutch magnet CM.

Relay contacts R6D which were opened by the energizing of relay R6, open the previously traced energizing circuit for the latch magnet LM. Thus, when clutch control cam contacts C3 close at 333° of this cycle of shaft 11 when the operation of the cycling control apparatus is initiated, the latch magnet LM will not be energized. The relay contacts R6D therefore disable or prevent the further reading of control tape 14. As is apparent from the previous description, the tape 14 will be spaced during the first cycle, but additional spacing during succeeding cycles is prevented until the latch magnet LM is again energized. The relay R6 remains energized and contacts R6D remain open until the end of a predetermined number of operating cycles of the cycling control apparatus.

At this point it is noted that a timing relay R72 is connected in parallel with the translating relays R1 to R5 inclusive and is therefore energized by analyzing cam contacts C2 when they close at 45° of each cycle of shaft 11 and is deenergized when such cam contacts open at 207°. Timing relay R72 controls the operation of its contacts R72A (see Fig. 18e); and, as indicated, these contacts R72A are held open during the period between 45° and 207° of each cycle of shaft 11 when R72 is energized, and are closed at 207° of each cycle and stap closed until 45° of the next succeeding cycle of shaft 11 when R72 is again energized.

Relay contacts R6B which closed when R6 was energized at 98° of the cycle of operation being described, condition a circuit including the pick up coil of relay R8 which circuit also includes the timing relay contacts R72A which do not close until 207° when relay R72 is deenergized. This conditioned pick up circuit is traced as follows: from positive conductor 200; contacts R72A; relay transfer contacts R19B, R17B, R15B, R13B, R11B, and R9B in the position shown; contacts R6B now shifted; the pick up coil of R8 and conductor 253 to negative conductor 201. As relay R7 is functionally considered to be the same as relay R6, relay R8 may be considered as being the second companion relay of the first relay control unit of the series.

Relay R8 when energized closes its hold contacts R8A and its conditioning contacts R8B. Contacts R8A establish a hold circuit through the hold coil of relay R8 which was conditioned by the closing of relay contacts R7A, as previously explained. As shown, this hold circuit includes the conductor 255, which is now connected by contacts R7A to positive conductor 200 through the conductors 248 and 249, and also includes the conductor 253 which is connected to negative conductor 201.

Closed relay contacts R8B condition a pick up circuit for relay R9; but, as will presently appear, such circuit cannot be established until the next succeeding cycle of shaft R11 when cam contacts C1 close at 98° to connect the positive conductor 200 with the conductor 206.

A summary of the events occurring during this first cycle of operation is as follows: A "new line" code designation, the L. F. designation, in the five-unit control tape 14, was sensed, converted and a corresponding "new line" code designation, the C. R. designation, was punched in the six-unit tape. The five-unit tape is spaced but further spacing and sensing is prevented by relay contacts R6D as long as relay R6 is energized. Concurrently therewith, the operation of the cycling control apparatus was initiated by the energizing of relays R6 at 98° through contacts C1, and immediately thereafter the relay R7. Relay R6 was held across the power source through R20B and conditioned an energizing circuit for relay R8 which was closed at 207° by the closing of contacts R72A. Relay R8 was held across the power line by contacts R7A and conditioned an energizing circuit for relay R9 which is not energized during this first cycle. As explained, the relays R6 and R8 may be considered as first and second companion relays of the first relay control unit of the series. Relay R6 is energized during a first part of the cycle and conditions an energizing circuit for the second companion relay R8, which is energized during the later part of such cycle and conditions an energizing circuit for relay R9 which may be considered as the first companion relay of the second relay control unit which is energized during the second cycle. The energizing of relays R6, R7, and R8 and the just described resulting operation comprise the initial operating step of the cycling control apparatus.

The second operating step of the cycling apparatus is effected during the next or second cycle of shaft 11. During such next cycle, cam contacts C1 close at 98° and thereby establish the pick up circuit for relay R9, previously conditioned by contacts R8B. This circuit is traced as follows: from conductor 200, cam contacts C1; conductor 206; relay transfer contacts R18B, R16B, R14B, and R12B in the position shown; contacts R8B in their shifted position; pick up coil of R9; and conductor 259 to negative conductor 201. Relay R9 closes its hold contacts R9A and shifts its transfer contacts R9B. Relay contacts R9A establish a hold circuit for relay R9 which is traced as follows: positive conductor 200, closed contacts R20B, conductor 250, contacts R9A, hold coil of relay R9, and the conductor 258 to the negative conductor 201. Transfer relay contacts R9B when shifted condition a pick up circuit for relay R10 which circuit is closed when timing contacts R72A close at 207° of this second cycle of shaft 11. Relay R10 is the second companion relay of the second relay control unit of the series. This pick up circuit for R10 is traced as follows: positive conductor 200; contacts 72A; relay transfer contacts R19B, R17B, R15B, R13B, and R11B in the position shown; contacts R9B in the shifted position; pick up coil of relay R10; and conductor 259 to negative conductor 201. Upon being energized at 207°, relay R10 closes its hold contacts R10A and shifts its transfer contacts R10B. Closure of the hold contacts R10A establishes the following hold circuit: from positive conductor 200, conductor 248, closed contacts R7A, conductor 249, conductor 255, conductor 260, contacts R10A, hold coil of relay R10, and conductor 259 to negative conductor 201.

The shifting of relay transfer contacts R10B conditions a pick up circuit for relay R11 which is the first companion relay of the third relay control unit of the series and cannot be picked up until cam contacts C1 close at 98° of the next or third cycle of shaft 11, because cam contacts C1 opened at 204° of this second cycle and relay R10 was not picked up until 207° of the second cycle when contacts R72A closed. This conditioned pick up circuit is as follows: from conductor 200, through cam contacts C1; conductor 206; transfer contacts R18B, R16B, R14B, and R12B in the position shown; R10B now shifted; pick up coil of R11; and conductor 261 to negative conductor 201.

At 120° of this second cycle of shaft 11 the clutch control cam contacts C4 close to establish an energizing circuit for clutch control relay R73 which, as stated above, includes the now-closed relay contacts R6C. Relay R73 when energized closes its contacts R73A to establish the previously traced energizing circuit for the clutch control magnet CM. As no code designation was sensed and consequently no distributing relays were energized during this second cycle of shaft 11, none of the selector magnets SM1 to SM6 inclusive were energized. Therefore, when clutch magnet CM is energized to effect operation of the perforator 110 only a feed hole 116 will be punched and the tape 114 will be spaced in the manner previously described.

Summarizing this second cycle of shaft 11 during which the cycling control effected its second operating step, relays R9 and R10, which compose the second relay control unit of the series, were picked up and held across the power line; relay R9 having been picked up at 98° and held through R20B, and relay R10 having been picked up at 207° and held through R7A. Shifted relay contacts R10B condition an energizing circuit for R11, the first companion relay of the third relay control unit. Also, the perforator 110 went through a cycle of operation and punched a feed hole in the tape 114 and spaced the tape.

In addition to relay R11 the third relay control unit comprises the companion relay R12. Relay R11 is energized by the previously traced circuit conditioned by the shifting of relay contacts R10B, and such conditioned circuit is closed by cam contacts C1 at 98° of this third cycle of shaft 11 to begin the third operating step of the cycling control apparatus. Relay R11 closes its hold contacts R11A, shifts its transfer contacts R11B, closes its contacts R11C, and opens its contacts R11D. The contacts R11A close a hold circuit for relay R11 which is under the control of normally closed relay contacts R20B. Relay transfer contacts R11B in the shifted position condition an energizing circuit for the pick up coil of relay R12 which circuit includes timing relay contacts R72A.

Closed contacts R11C connect the positive conductor 200 with the hold circuit conductor 255. The closing of these contacts do not affect the operation of the cycling control apparatus in response to the sensing of a "new line" code designations; because, at this time, hold conductor 255 is already connected to positive conductor 200 through contacts R7A. As will appear hereinafter, the contacts R11C are useful in the operation of the cycling control apparatus in response to the sensing of a TAB code designation. Opened contacts R11D open the latch magnet circuit; but, as this circuit is already open at R6D, contacts R11D serve no purpose in the operations of the apparatus in response to the sensing of the "new line" designation. Like R11C, contacts R11D are of value in the operation of the apparatus in response to the sensing of a TAB designation, as will presently appear.

When the timing contacts R72A close at 207° of this third cycle of shaft 11, relay R12 is energized and closes its hold contacts R12A and shifts its transfer contacts R12B. Closed contacts R12A establish a hold circuit through the hold coil of relay R12, which circuit is under the control of now closed relay contacts R7A. The shifting of relay contacts R12B conditions a pick up circuit for relay R13, the closure of which is controlled by the cam contacts C1 which are open at the time R12 is energized.

At 120° of this third cycle, the cam contacts C4 close to energize clutch control relay R73 and thereby effect the energizing of clutch magnet CM and a cycle of operation of the perforator 110 during which only a feed hole perforation 116 is punched in the record tape 114 and the latter is spaced.

The fourth relay control unit to be energized, is energized during the next or fourth cycle of shaft 11 to effect the fourth operating step of the cycling control apparatus. The fourth relay control unit comprises first companion relay R13 and second companion relay R14. As a pick up circuit for relay R13 was conditioned in the previous cycle by the shifting of relay contacts R12B, relay R13 is picked up by the closing of cam contacts C1 at 98° of this fourth cycle of shaft 11. When energized, relay R13, closes its hold contacts R13A, shifts its transfer contacts R13B and closes its contacts R13C and R13D. Closed contacts R13A establish a hold circuit across the power line through closed contacts R20B. Contacts R13B in the shifted position condition a pick up circuit for relay R14 which pick up circuit is under the control of timing contacts R72A which close at 207° of this fourth cycle and thereby energize the relay R14.

Closed contacts 13C (see Fig. 18a) connect the conductor 225 and clutch control relay R73, and thereby provide for energizing the latter at 120° of each cycle of shaft 11 when cam contacts C4 close. However, the closing of contacts R13C during the operation of the cycling control apparatus in response to the sensing of a "new line" code designation, does not affect such operation, because, as explained above, previously closed contacts R6C have already connected conductor 225 and clutch control relay R73 and thereby placed the latter under the control of cam contacts C4. As will be explained hereinafter, the performance of the just mentioned function by the contacts R13C, is useful in the operation of the cycling control apparatus in response to the sensing of a TAB code designation.

Closed contacts R13D condition a holding circuit for relay R19 which, as will presently appear, is closed by contacts R19A when relay R19 is picked up during the seventh cycle of the operation being described. This conditioned holding circuit includes a conductor 263 which is connected to positive conductor 200 a conductor 264 connecting R13D and R19A and a conductor 265 connecting relay R19 and negative conductor 201.

With contacts R13B in shifted position, second companion relay R14 is picked up by the closing of timing contacts R72A at 207° of this fourth cycle of shaft 11 and relay R14 closes its hold contacts R14A which establish a hold circuit across the power line under the control of now closed relay contacts R7A. R14 also shifts its transfer contacts R14B to condition a pick up circuit for relay R15 which circuit is under the control of cam contacts C1 and cannot be closed until 98° of the next cycle.

At 120° of this fourth cycle cam contacts C4 again close to energized clutch control relay R73 and thereby effect, in the same manner as previously described, a cycle of operation of the perforator 110 during which a feed hole perforation 116 is punched in the tape 114 and the latter is spaced.

The fifth relay control unit to be energized comprises first companion relay R15 and second companion relay R16. At 98° of the fifth cycle of shaft 11, cam contacts C1 close, thereby establishing the previously conditioned energizing circuit for relay R15. Relay R15 upon being energized closes its hold contacts R15A to hold the relay across the power line under the control of now closed relay contacts R20B. R15 shifts its transfer contacts R15B to condition a pick up circuit for relay R16, the latter being closed at 207° when timing relay contacts R72A close. Upon being energized, second companion relay R16 closes its hold contacts R16A to hold the relay across the power line under the control of now closed relay contacts R7A. Relay R16 shifts its transfer contacts R16B to condition a pick up circuit for relay R17 which conditioned pick up circuit is under control of cam contact C1 and will be closed at 98° of the next cycle of shaft 11. Cam contacts C4 close at 120° of this fifth cycle and thereby effect the operation of the perforator 110 to punch a feed hole perforation 116 in the tape 114 and space the tape 114 in the manner previously explained.

The sixth relay control unit comprises a first companion relay R17 and a second companion relay R18. Relay R17 is energized at 98° of the sixth cycle by the previously conditioned pick up circuit under the control of cam contact C1. When energized, relay R17 closes its hold contacts R17A and shifts its transfer contacts R17B. Closed contacts R17A establish a hold circuit through relay R17 under the control of now closed relay contacts R20B. Contacts R17B in shifted position condition a pick up circuit for relay R18 which includes the relay timing contacts R72A. The latter close at 207° to energize the relay R18 which closes its hold contacts R18a and shifts its transfer contacts R18B. Closed contacts R18A establish a hold circuit for relay R18 under the control of now closed relay contacts R7A. Transfer contacts R18B in shifted position establish a pick up circuit for a relay R19 which is under the control of cam contacts C1 which, as stated previously, are open for the latter portion of each cycle of shaft 11. At 120° of this sixth cycle cam contacts C4 again close thereby energizing clutch control relay R73 to effect a cycle of operation of the perforator 110 during which a feed hole perforation 110 is punched and the tape 114 is spaced.

The seventh relay control unit comprises first companion relay R19 and second companion relay R20. The relay R19 is energized at 98° of the seventh cycle by the closing of cam contacts C1 and through the circuit which was previously conditioned by the shifting of transfer contacts R18B. Relay R19 closes its hold contacts R19A and shifts its transfer contacts R19B. Closed contacts R19A establish the holding circuit across the power line which was previously conditioned by the closing of relay contacts R13D. The shifted transfer contacts R19B condition a pick up circuit for second companion relay R20 which includes the relay timing contacts R72a, the latter closing at 207° of this seventh cycle to establish said conditioned pick up circuit and thereby energize relay R20. At 120° of the seventh cycle cam contacts C4 close to energize clutch control relay R73 and thereby effect a cycle of operation of the perforator 110 to punch a feed hole 116 in the tape 114 and to space the tape.

From an examination of Fig. 18a it is noted that when cam contacts C4 close at 120° of the seventh cycle they also establish a branch parallel circuit through relay R74 which will remain energized until 225° when contacts C4 open. Relay R74 closes its contacts R74A and thereby connects to hold circuit conductor 225, previously referred to, with positive conductor 200 through conductor 227. Thus, hold conductor 255 is connected by contacts R74A to positive conductor 200 from 120° to 255° of each cycle of shaft 11. This has not made any difference in the operation of the cycling control apparatus for the first six cycles as relay contacts R7A have been closed since the operation was initiated. The purpose of contacts R74A in this seventh cycle will presently appear.

At 207° of this seventh cycle, contacts R72A close and thereby energize relay R20 by the circuit previously conditioned by the shifting of contacts R19B. Relay R20 when energized closes its hold contacts R20A and opens its normally closed contacts R20B.

The closing of contacts R20A establishes a hold circuit for relay R20 which extends from the positive side of the line, through hold circuit conductor 255, the hold coil of relay R20, and conductor 268 to the negative conductor 201. The opening of contacts R20B will open the relay holding circuit extending therethrough and thereby drop out relay R6, R7, R9, R11, R13, R15, and R17 and return the contacts controlled by the latter relays to their positions shown in the drawings.

Relays R6 and R11, when deenergized, reclose their contacts R6D and R11D to place the energizing circuit for latch magnet LM again under the control of cam contacts C3. Thus, at 333° of this seventh cycle the magnet LM is energized and the normal sensing and spacing of control tape 14 is resumed during the following cycle. Contacts R6C are also opened, and also contacts R13C are opened when relay R13 drops out. The latter will prevent further energizing of clutch control relay R73 and will return the control of the perforator to the other clutch control relay R71. It is noted that the perforator 110 operates during the seventh cycle to punch the feed perforation 116 and space the tape 114, because relays R6 and R13 were not dropped out until R20 was energized at 207° by the closing of R72A, and cam contacts C4 closed previously at 120°.

Relay R13 opens its contacts R13D to drop out relay R19.

Relays R7 and R11, when deenergized, open their contacts R7a and R11c. However, the opening of either of these contacts will not at this moment open the holding circuits for any of the relays which include the hold conductor 255, because contacts R74A remain closed until after 225° when cam contacts C4 open and deenergize relay R74. When the latter happens at 225° and contacts R74A open, the remaining cycling relays, R8, R10, R12, R14, R16, R18, and R20 drop out and return their contacts to the position shown in Fig. 18e. The relay R74 and its contacts R74A make sure that relay R20 stays energized during the seventh cycle and holds open its contacts R20B long enough to provide for dropping out all relays controlled by R20B before hold circuit conductor 255 is disconnected from the positive conductor to open the holding circuits for the rest of the cycling relays including R20. Thus, the cycling control apparatus is restored to its normal ineffective condition and will remain in such condition until a "new line" designation is again sensed or until a TAB designation is sensed.

From the foregoing it is apparent that when a "new line" code designation (the L. F. designation) is sensed in the five-unit tape 14, such designation is converted by the relay translator, and a corresponding code designation in the six-unit code (the C. R. designation) is recorded in the tape 114. This all occurs during one cycle of operation of the recording apparatus. During this same cycle and in response to the sensing of such "new line" designation, the operation of the cycling control apparatus is initiated by the energizing of the first of a series of seven relay control units and thereby effecting the first of a series of seven operating steps. The cycling control apparatus operates during this first cycle to prevent further sensing and spacing of the tape. The succeeding six operating steps of the cycling apparatus are effected by progressively energizing the six remaining relay control units during the next succeeding six cycles of shaft 11. During each such succeeding cycle the cycling control apparatus effects an operation of the perforator 110 to punch a feed hole 116 and to space the tape 114 one space. When the last of the series of relay control units is energized and after the punching of the sixth space hole and the spacing of the tape 114 for the sixth time after the recording of the "new line" code designation, the last relay control unit automatically restores the cycling control apparatus to its normal ineffective condition and also restores the means for sensing and feeding the control tape 14 to its normal condition of operation.

The operation of the cycling control apparatus as a result of the sensing of a TAB code designation in the control tape is approximately the same as that just described in connection with the sensing of the "new line" designation, with the exception that only the last five of the relay control units shown in Fig. 18e are progressively energized during succeeding cycles of the shaft 11 when the operation of the cycling control apparatus is initiated by the sensing of the TAB designation. As will be apparent from the foregoing description, when the TAB designation is sensed, it is converted by the relay translator into a corresponding designation in the six-unit code and the latter is recorded in the tape 114 and the tape 114 is spaced; and, during this same cycle of shaft 11, the operation of the cycling control apparatus is initiated by the energizing of a relay control unit which is the third of the series previously described, but is considered as the first of a series now to be described. As before, when the operation of the cycling control apparatus is initiated, further sensing and spacing of the control tape 14 is stopped, and the second of the series of relay control units to be energized is conditioned so that it will be energized during the next cycle of shaft 11. The cycling control apparatus operates in five succeeding steps, the first step being effected by the energizing of the first of the series of relay control units and the remaining four steps being progressively effected by the energizing of the remaining four relay control units of the series during the next succeeding four cycles of shaft 11. For each of these succeeding four cycles of shaft 11, the cycling control apparatus provides for the operation of the perforator 110 to punch only a feed hole perforation 116 in the tape 114 and to space the latter, so that the tape 114 will be provided with four perforations 116 and spaced four times following the recording of the TAB code designation in the six-unit code.

The first relay control unit to be energized as a result of sensing the TAB code designations comprises a first companion relay R11 and a second companion relay R12. The second relay control unit comprises a first companion relay R13 and a second companion relay R14. The third relay control unit comprises a first companion relay R15 and a second companion relay R16. The fourth relay control unit comprises first companion relay R17 and second companion relay R18. The fifth and last relay control unit to be energized comprises first companion relay R19 and second companion relay R20.

As explained hereinabove, a TAB code designation in the control tape 14 is preceded by a figure shift code designation. The operation of the recording apparatus which takes place as a result of the sensing of a figure shift code designation was fully explained above. Therefore, it is only necessary to say at this point that in response to the sensing of the figures shift code designation the figures relay R68 is energized to close the energizing circuit for supervisory figures relay R70 and the latter circuit is held closed through contacts R69A until a subsequent sensing of a letter shift code designation which will energize the relay R69 and open the contacts R69A. When supervisory relay R70 is thus energized, its transfer contacts R70A to R70BB are shifted from their respective lower positions shown in the drawings to their respective upper positions.

As shown in Figs. 7 and 8 the TAB code designation is the figures "G" code designation, and comprises code perforations in the number 2, 4, and 5 code positions of the control tape 14. Thus, when the TAB code designation is sensed at 33° of a cycle of shaft 11, sensing contacts SC2, SC4, and SC5 are closed to condition energizing circuits including, respectively, translating relays R2, R4, and R5. When cam contacts C2 close at 45°, the translating relays R2, R4, and R5 are energized and shift their related transfer contacts to condition a translating circuit including the TAB distributing relay R50. This circuit is closed at 98° of the cycle when cam contacts C1 close, thereby energizing relay R50 which closes its hold contacts R50A and its code contacts R50B. The closing of contacts R50B provide for the immediate selection of selector magnet SM3 and its related code punch in the manner previously explained by a circuit which is traced as follows: from positive conductor 200, conductor 227, conductor 228, closed contacts R50B, code wire CW3, selector magnet SM3, and conductor 229 to negative conductor 201. The closing of hold contacts R50 conditions a hold circuit for relay R50 including the clutch control magnet R71. Thus, when cam contacts C4 close at 120° a hold circuit for distributing relay R50 is established and also the clutch control relay R71 is energized to close its contacts R71A which in turn close the energizing circuit for clutch magnet CM. When the clutch magnet is thus energized the perforator 110 is operated to provide a code perforation 115 in the number three code position of tape 114 and tape 114 is spaced. As shown in Figs. 9 and 10 this is the TAB designation in the six-unit code.

Concurrently with the energizing of the distributing relay R50 by the closing of cam contacts C1 at 98°, a branch parallel circuit is established from shifted contacts R70U, through conductor 269, relay transfer contacts R10B, in the position shown and through the pick up coil of relay R11 and conductor 261 to the negative conductor 201. Relay R11 closes its hold contacts R11A and shifts its transfer contacts R11B and closes its contacts R11C and opens its contacts R11D. The hold contacts R11A establish a hold circuit across the power line under the control of normally closed relay contacts R20B. The shifting of transfer contacts R11B conditions a pick up circuit of second companion relay R12 which will be closed at 207° when timing relay contacts R72A close. The closing of contacts R11C connects the positive conductor 200 to the hold circuit conductor 255 and thus conditions a hold circuit for certain of the cycling relays which will be energized later on in the operation, as will presently appear.

When contacts R11D open, they open the energizing circuit for latch magnet LM so that at 333° of the cycle of shaft 11 being described, the latch magnet will not be again energized by cam contacts C3. From the previous description it will be apparent that the tape 14 will be spaced once again to bring the next succeeding code designation into sensing position, but such succeeding designation will not be sensed and further spacing of the tape will be prevented due to the fact that latch magnet LM is not energized. This condition will continue until relay R11 is deenergized to close again its contacts R11D.

At 207° when timing relay contacts R72A close and energize relay R12 through the conditioned pick up circuit referred to above, relay R12 closes its hold contacts R12A and shifts its transfer contacts R12B. Hold contacts R12A establish a hold circuit for relay R12 across the power line which is under the control of now closed relay contacts R11C, as explained above. The shifting of transfer contacts R12B conditions a pick up circuit for first companion relay R13 of the next relay control unit to be energized, which pick up circuit will be closed by cam contacts C1 during the succeeding cycle.

During the next or second cycle of this operation of the cycling control apparatus now being described, cam contacts C1 close at 98° to pick up first companion relay R13. Relay R13 closes its hold contacts R13A, shifts its hold contacts R13B, and closes its contacts R13C and its contacts R13D. The hold contacts R13A establish a hold circuit for relay R13 across the power line which is under the control of contacts R20B. The shifting of transfer contacts R13B conditions a pick up circuit for second companion relay R14 which will be established at 207° of this cycle when timing contacts R72A close. The closing of relay contacts R13C conditions an energizing circuit for clutch control relay R73 which is under the control of cam contacts C4. As explained above, the latter close at 120° to energize R73 and thereby close contacts R73A to establish the energizing circuit for clutch magnet CM. As no selector magnets have been previously energized during this second cycle, the perforator 110 will be operated to punch a feed hole 116 in the tape 114 and to space the latter. The closing of contacts R13D conditions a hold circuit for relay R19, which circuit will be closed during the fifth cycle described hereinbelow.

When second companion relay R14 is closed at 207° by the closing of contacts R72A, relay R14 closes its hold contacts R14A and shifts its relay contacts R14B. Contacts R14A establish a hold circuit for R14 across the power line under the control of closed contacts R11C. Shifted contacts R14B condition an energizing circuit for the first companion relay R15 of the next relay control unit of the series.

During the next or third cycle of shaft 11 cam contacts C1 close, at 98°, the previously conditioned pick up circuit for relay R15. Relay R15 closes its hold contacts R15A and shifts its transfer contacts R15B. Hold contacts R15A establish a hold circuit across the power line for relay R15 which is under the control of the relay contacts R20B. Shifted transfer contacts R15B condition an energizing circuit for second companion relay R16. The latter circuit is closed at 207° by the closing of timing R72A and the relay R16 thereby closes its hold contacts R16A and shifts its transfer contacts R16B. Hold contacts R16A establish a hold circuit across the power line for relay R16 which is under the control of contacts R11C. The shifted transfer contacts R16B condition a pick up circuit for first companion relay R17 of the next relay control unit of the series to be energized. At 120° of this third cycle, cam contacts C4 closed to energize clutch control relay R73 which closed its contacts R73A to establish the energizing circuit for clutch magnet CM. Thus, the perforator goes through a cycle of operation to punch a feed perforation 116 in the tape 114 and to space the latter.

During the next or fourth cycle, the previously conditioned pick up circuit for relay R17 is closed at 98° by cam contacts C1, and relay R17 closes its hold contacts R17A and shifts its transfer contacts R17B. Contacts R17A establish a hold circuit across the power source for relay R17 under the control of contacts R20B. Shifted transfer contacts R17B condition a pick up circuit for second companion relay R18 which is closed at 207°. As before, at 120° of this fourth operating cycle cam contacts C4 energize clutch control relay R73 to close its contacts R73A and thereby establish a circuit through clutch magnet CM which will effect a cycle of operation of the perforator 110 to punch a feed hole perforation 116 in the tape 114 and to space the latter. At 207° when relay R18 is energized by the closing of contacts R72A, R18 closes its hold contacts R18A, and shifts its transfer contacts R18B. Hold contacts R18A establish a hold circuit for R18 under the control of contacts R11C. The shifting of transfer contacts R18B conditions a pick up circuit for the first companion relay R19 of the next and last relay control unit to be energized.

During the fifth and last operating cycle of shaft 11, relay R19 is picked up by the previously conditioned pick up circuit when the latter is closed at 98° by cam contacts C1. Relay R19 closes its hold contacts R19A and shifts its transfer contacts R19B. The contacts R19A establish the hold circuit for relay R19 previously conditioned by the closing of relay contacts R13D.

The shifting of relay contacts R19B conditions a pick up circuit for relay R20. At 120°, cam contacts C4 again close to energize relays R73 and close contacts R73A to establish an energizing circuit for clutch magnet CM which effects a cycle of operation of the perforator 110 to punch a feed hole 116 in the tape 114 and to space the latter.

At this point relays R11, R13, R15, and R17 are held by relay contacts R20B; relays R12, R14, R16, and R18 are held through contacts R11C; and relay R19 is held through contacts R13D. As explained previously, when cam contacts C4 close at 120° of each cycle they energize relay R74 which closes its contacts R74A and thereby provides another connection between the hold circuit wire 255 and positive wire 200 and this connection is held until 225° when cam contacts C4 open. At 207°, timing contacts R72A close to establish the previously conditioned pick up circuit for relay R20 which closes its hold contacts R20A and opens the normally closed contacts R20B. Contacts R20A establish a hold circuit for relay R20 from the hold circuit conductor 255; and, as previously explained, conductor 255 at this time is connected to the positive conductor 200 by both contacts R11C and contact R74A. The opening of contacts R20B drops out relays R11, R13, R15, and R17. Relay R11 opens its contacts R11C to place the hold circuits previously held thereby, under the sole control of contacts R74A. Relay R11 when deenergized permits closing of its contacts R11D to place again the energizing of the latch magnet LM under the control of the cam contacts C3 and thereby restore the sensing and spacing of the control tape 14 to its normal condition. The deenergizing of relay R13 opens its contacts R13D to drop out relay R19. The opening of relay contacts R13C opens the energizing circuit for clutch control relay R73 which was held conditioned thereby during the preceding cycles. However, as explained above, the opening of contacts R13C will not prevent the energizing of clutch magnet CM during this fifth cycle because R13C do not open until after 207° when relay R20 is dropped out and cam contacts C4 were previously closed at 120° to establish this energizing circuit for clutch control relay R73 and thereby effect the operation of the perforator in the manner previously described. As explained above, when cam contacts C4 open at 225° to deenergize relay R74 and thereby open its contacts R74A, the hold circuit for relays R12, R14, R16, R18, and R20 is opened and the relay cycling control apparatus is thereby restored to its normal ineffective condition. At 333° cam contacts C3 close to energize the latch magnet LM and from then on, the recording apparatus operates in its normal manner.

While there have been shown and described and pointed out the fundamental novel features of the invention, as applied to the several embodiments, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In recording apparatus, means for successively producing code signals representing character data and functional operations; means controlled by said code signals and operable to record successively in a record sheet, code designations representing, respectively, the character data and functional operations represented by the signals; means normally operable to space said record sheet for each code recording operation so as to bring blank recording areas on said sheet into recording position; cycling means operable when initiated to provide a predetermined number of controlling cycles of operation; means controlled by the signal producing means upon the producing of a code signal representing a particular functional operation, for initiating the operation of said cycling means; and means controlled by said cycling means for effecting an operation of said record sheet spacing means once for each of said predetermined member of controlling cycles.

2. In recording apparatus, means for successively producing code signals representing character data and functional operations; means controlled by said code signals and operable to record successively in a record sheet, code designations representing, respectively, the character data and functional operations represented by the signals; means normally operable to space said record sheet for each code recording operation so as to bring blank recording areas on said sheet into recording position; cycling means operable when initiated to provide a predetermined number of controlling cycles of operation; means responsive to the signal producing means producing a code signal representing a particular functional operation, for initiating operation of said cycling means and for rendering said signal producing means inoperative; means controlled by said cycling means for effecting operation of said record sheet spacing means once for each of said predetermined number of controlling operating cycles; and means operable upon said cycling means providing its said predetermined number of controlling cycles for rendering said signal producing means again operative.

3. In a recorder, the combination of means for successively producing code signals representing character data and functional operations; means controlled by said signals for successively recording in a record sheet, code designations representing, respectively, the character data and functional operations represented by the signals; means normally operable to space said record sheet for each code recording operation; cycling control apparatus effective when initiated to operate in a predetermined number of succeeding steps and comprising a plurality of relay control units equal in number to said operating steps and being adapted to be energized in a prescribed serial order, a mechanism operating continuously in recurring cycles while said cycling apparatus is operating, an impulse transmitting means responsive to said mechanism and providing at least one energizing impulse for each cycle of said mechanism, and means conditioned by the energizing of each relay control unit of the series except the last, during one cycle of said mechanism, for routing the impulse transmitted during the next cycle to the next relay unit of the series; means responsive to said signal producing means producing a code signal representing a particular functional operation for energizing the first relay control unit of the series and thereby initiating operation of said cycling control apparatus; means controlled by said cycling control apparatus and operable during each of said predetermined number of steps, after the initial step, for effecting an operation of said record sheet spacing means; and means controlled by the energizing of the last relay unit of the series for rendering said cycling control apparatus ineffective.

4. In a recorder, the combination of means for successively producing code signals representing character data and functional operations; means controlled by said signals for successively recording in a record sheet, code designations representing, respectively, the character data and functional operations represented by the signals; means normally operable to space said record sheet for each code recording operation; cycling control apparatus effective when initiated to operate in a predetermined number of succeeding steps and comprising a plurality of relay control units equal in number to said operating steps and being adapted to be energized in a prescribed serial order, a mechanism operating continuously in recurring cycles while said cycling apparatus is operating, an impulse transmitting means responsive to said mechanism and providing at least one energizing impulse for each cycle of said mechanism, and means conditioned by the energizing of each relay control unit of the series, except the last, during one cycle of said mechanism, for routing the impulse transmitted during the next cycle to the next relay unit of the series; means responsive to the signal producing means producing a code signal representing a particular functional operation for initiating operation of said cycling control apparatus by energizing said first relay control unit and for rendering said signal producing means inoperative; means controlled by said cycling control apparatus for effecting operation of said record sheet spacing means once for each of said predetermined number of operating steps after the initial step; and means responsive to the energizing of the last relay control unit of said serial order for rendering said signal producing means again operative and for deenergizing said last relay unit and any of the other of said relay units then energized.

5. In recording apparatus, means for successively producing code signals representing character data and functional operations; means controlled by said code signals and operable to record successively in a record sheet, code designations representing, respectively, the character data and functional operations represented by the signals; means normally operable to space said record sheet for each code recording operation so as to bring blank recording areas on said sheet into recording position; cycling means effective when initiated to operate for a predetermined number of cycles; means responsive to the signal producing means upon the producing of a code signal representing a particular functional operation, for initiating the operation of said cycling means; means for preventing further operation of said signal producing means after said cycling means begins operation and operable upon said cycling means completing its said predetermined number of operating cycles for rendering said signal producing means again operative; and means for effecting operation of said record sheet spacing means to successively space said record sheet while said cycling means is operating.

6. In record controlled recording apparatus, mechanism operating continuously in recurring cycles; means controlled by said mechanism and operable to sense code designations recorded in a control record according to one code and representing character data and functional operations, and operable to convert the sensed code designations into corresponding code designations of a different code and to record the latter designations in a second record sheet; means normally operable for spacing said control record for each cycle of operation of said mechanism so as to bring successive code designations into sensing position; means normally operable for spacing said second record sheet for each recording of a code designation so as to bring blank recording areas into recording position; cycling means controlled by said mechanism and effective when initiated to operate for a predetermined number of cycles; means controlled by the sensing of a code designation for a particular functional operation for disabling said control record spacing means and operable concurrently therewith for initiating operation of said cycling means; means responsive to the completion of said predetermined number of operating cycles of said cycling means for restoring said control record feeding means to its normal operating condition; and means operable during the operation of said cycling means for effecting successive operations of said spacing means for said second record sheet.

7. In record controlled recording apparatus, mechanism operating continuously in recurring cycles; reading means controlled by said mechanism and normally operable during successive cycles to sense, respectively, successive code designations contained in a control record sheet and representing character data and functional operations according to one code system; means responsive to said reading means and operable to convert each code designation sensed into a code designation of a different code and to record the latter designation into a second record sheet; means normally operable to space said second record sheet once for each recording operation so as to bring blank recording areas into recording position; cycling means controlled by said mechanism and effective when initiated to operate for a predetermined number of cycles; means controlled by the sensing of a code designation for a particular functional operation for disabling said reading means and operable concurrently therewith to initiate an operation of said cycling means; means controlled by the cycling means completing its predetermined number of cycles of operation for restoring said reading means to its normal condition of operation; and means operable during the operation of said cycling means for effecting successive operations of said spacing means for said second record sheet.

8. In a recorder, the combination of means for successively producing code signals representing character data and functional operations; means controlled by said signals for successively recording in a record sheet, code designations representing, respectively, the character data and functional operations represented by the signals; means normally operable to space said record sheet for each code recording operation; cycling control apparatus effective when initiated to operate for a predetermined number of succeeding cycles and comprising a plurality of relay control units equal in number to said operating cycles and being adapted to be energized in a prescribed serial order, a mechanism operating continuously in recurring cycles while said cycling apparatus is operating, an impulse transmitting means responsive to said mechanism and providing at least one energizing impulse for each cycle of said mechanism, and means conditioned by the energizing of each relay control unit of the series, except the last, during one cycle of said mechanism, for routing the impulse transmitted during the next cycle to the next relay unit of the series; means responsive to said signal producing a code signal representing a particular functional operation for initiating operation of said cycling control apparatus by energizing said first relay control unit and for rendering said signal producing means inoperative; means controlled by the energizing of said last relay control unit of the series for restoring said signal producing means to its normal operating condition and for deenergizing said last relay unit and any other of said relay units then energized; and means for successively operating said record sheet spacing means while said cycling control apparatus is operating.

9. In record controlled recording apparatus, mechanism operating continuously in recurring cycles; means controlled by said mechanism and operable to sense code designations recorded in a control record according to one code and representing character data and functional operations and operable to convert the sensed code designations into corresponding code designations of a different code and to record the latter designations in a second record sheet; means normally operable to space said control record for each cycle of operation of said mechanism so as to bring successive code designations therein into sensing position; means normally operable for spacing said second sheet for each recording of a code designation so as to bring blank recording areas therein into recording position; cycling means controlled by said mechanism and operable when initiated to provide a predetermined number of controlling cycles of operation; means responsive to the sensing of a code designation for a particular functional operation for initiating operation of said cycling means and for disabling said control record spacing means; means for operating said second record sheet spacing means once for each of said predetermined number of controlling cycles; and means operable upon such cycling means completing its predetermined number of controlling cycles for restoring said control record spacing means to its normal condition of operation.

10. In record controlled recording apparatus, mechanism operating continuously in recurring cycles; means controlled by said mechanism and operable to sense code designations recorded in a control record according to one code and representing character data and functional operations and operable to convert the sensed code designations into corresponding code designations of a different code and to record the latter designations in a second record sheet; means normally operable to space said control record for each cycle of operation of said mechanism so as to bring successive code designations therein into sensing position; means normally operable for spacing said second sheet for each recording of a code designation so as to bring blank recording areas therein into recording position; cycling means controlled by said mechanism and operable when initiated to provide a predetermined number of controlling cycles of operation; means responsive to the sensing of a code designation for a particular functional operation for initiating operation of said cycling means and for disabling said control record spacing means; means effective concurrently with the initiation of operation of said cycling means for operating the spacing means for the second record sheet once for each of said predetermined number of controlling cycles; and means effective upon a completion of operation of said cycling means for restoring said control record spacing means and said second record sheet spacing means to their normal condition of operation.

11. In record controlled recording apparatus, mechanism operating continuously in recurring cycles; means controlled by said mechanism and operable to sense code designations recorded in a control record according to one code and representing character data and functional operations and operable to convert the sensed code designations into corresponding code designations of a different code and to record the latter designations in a second record sheet; means normally operable to space said control record for each cycle of operation of said mechanism so as to bring successive code designations therein into sensing position; means normally operable for spacing said second sheet for each recording of a code designation so as to bring blank recording areas therein into recording position; cycling means controlled by said mechanism and operable when initiated to provide a predetermined number of controlling cycles of operation; means responsive to the sensing of a code designation for a particular functional operation for initiating operation of said cycling means and for disabling said control record spacing means; means effective concurrently with the initiation of operation of said cycling means and controlled by said mechanism for operating the spacing means for said second record sheet once for each of said predetermined number of controlling cycles; and means controlled by said cycling means and operable upon a completion of said predetermined number of controlling cycles for restoring said control record spacing means and said second sheet spacing means to their normal condition of operation.

12. In record controlled recording apparatus, cyclically operable reading means normally operable to successively sense during successive cycles code designations contained in a control record sheet and representing, respectively, character data and functional operations according to one code system; means controlled by said reading means and operable during the cycle each code designation is sensed to convert each such code designation sensed into a code designation of a different code system and to record the latter designation in a second record sheet; means normally operable to space said second record sheet once for each recording operation so as to bring a blank recording area into recording position; cycling means operable when initiated to provide a predetermined number of controlling cycles of operation; means responsive to the sensing of the code designation for a particular functional operation, for disabling said reading means and for initiating operation of said cycling means; means controlled by said cycling means and operable after the recording in said different code of the code designation representing said particular functional operation, for effecting operation of said spacing means for said second record sheet once for each of said predetermined number of controlling cycles; and means controlled by said cycling means upon a completion of said predetermined number of controlling cycles for restoring said reading means to its normal condition of operation.

13. In record controlled recording apparatus, mechanism operating continuously in recurring cycles; means controlled by said mechanism and operable to sense successively code representations of character data and functional operations recorded in a control record sheet according to one code system; means for spacing said control record sheet to bring the recorded code representations successively into sensing position; recording means comprising selectively operable code elements for recording in a second record sheet code representations of such data and functional operations according to a different code system; translating means controlled by said sensing means and selectively controlling said recording code elements for converting the code representations in said control record into code representations of said different code and to record the latter in said second record sheet; means normally operable for spacing said second record sheet for each recording operation so as to bring blank recording areas into recording position; means responsive to the sensing of a code representation of a certain functional operation for disabling said control record spacing means; means operable concurrently with the last named means and controlled by said mechanism for effecting operation of said spacing means for the second record sheet, once for each of a predetermined number of cycles of operation of said mechanism; and means operable upon said mechanism operating for said predetermined number of cycles for disabling said last-named means and for restoring said control record spacing means to normal operating condition.

14. In record controlled recording apparatus, mechanism operating continuously in recurring cycles; means controlled by said mechanism and operable to sense successively code representations of character data and functional operations recorded in a control record sheet according to one code system; means for spacing said control record sheet to bring the recorded code representations successively into sensing position; recording means comprising selectively operable code elements for recording in a second record sheet code representations of such data and functional operations according to a different code system; translating means controlled by said sensing means and selectively controlling said recording code elements for converting the code representations in said control record into code representations of said different code and to record the latter in said second record sheet; means normally operable for successively spacing said second record sheet for each recording operation so as to bring blank recording areas into recording position; means responsive to the sensing of a code representation of a certain functional operation for disabling both said sensing means and the control record spacing means; means operable concurrently with the last named means and controlled by said mechanism for effecting operation of said spacing means for said second record sheet, once for each of a predetermined number of cycles of operation of said mechanism; and means operable upon said mechanism operating for said predetermined number of cycles for disabling said last-named means and for restoring said sensing means and control record spacing means to normal operating condition.

15. In record controlled recording apparatus, mechanism operating continuously in recurring cycles; means controlled by said mechanism and normally operable during successive cycles to sense, respectively, code designations representing character data and functional operations recorded in a control record sheet according to one code system; means controlled by said mechanism and normally operable to space said control record once for each cycle to bring the recorded code designations successively into sensing position; recording means operable to record in a second record sheet according to a different code, code designations representing said character data and functional operations, and said recording means comprising a plurality of selectively operable code elements, and record effecting means controlled by said mechanism and operable during a cycle to effect recording of any selected code elements and to space said second record sheet to bring a blank recording area into recording position; translating means controlled by said sensing means and operable during a cycle when a code designation in the control record is sensed, to select the proper code elements for converting the sensed code designations into said different code; cycling means controlled by said mechanism and operable when initiated for a predetermined number of controlling cycles of operation; means responsive to the sensing of a code designation representing a particular functional operation for initiating an operation of said cycling means and for disabling said sensing means and said control record spacing means; means controlled by said cycling means and operable after the recording in said different code of a code designation representing said particular functional operation, to effect operation of said record effecting and spacing means once for each of said predetermined number of controlling cycles; and means controlled by said cycling means upon a completion of said predetermined number of controlling cycles for restoring said sensing means and said control record spacing means to their normal operating condition.

16. In record controlled recording apparatus, mechanism operating continuously in recurring cycles; reading means controlled by said mechanism and normally operable to sense successively code designations recorded in a control record sheet according to one code system and representing, respectively, character data and functional operations; means controlled by said reading means and operable to translate each such sensed code designation into a designation of a different code system and to record the latter designation in a second record sheet; means normally operable to space said second record sheet once for each recording operation so as to bring a blank recording area into recording position; cycling means controlled by said mechanism and operable when initiated to provide a predetermined number of controlling cycles of operation; means responsive to the sensing of a preselected code designation to initiate operation of said cycling means and to stop operation of said reading means; means effective upon the initiation of the operation of said cycling means for operating said spacing means for the second record sheet once for each of said predetermined number of controlling cycles; and means controlled by said cycling means to render the latter ineffective at the completion of said predetermined number of controlling cycles and to restore said reading means and said spacing means for the second record sheet to their normal operating condition.

17. In record controlled recording apparatus, mechanism operating continuously in recurring cycles; means controlled by said mechanism and operable to sense code designations recorded in a control record according to one code and representing character data and functional operations and operable to convert the sensed code designations into corresponding code designations of a different code and to record the latter designations in a second record sheet; means normally operable to space said control record for each cycle of operation of said mechanism so as to bring successive code designations therein into sensing position; means normally operable for spacing said second sheet for each recording of a code designation therein so as to bring into recording position blank recording areas; cycling control means effective when initiated to operate in a predetermined number of succeeding steps and comprising a plurality of relay control units equal in number to said operating steps and being adapted to be energized in a prescribed serial order, an impulse transmitting means responsive to said mechanism and providing at least one energizing impulse for each cycle of said mechanism, and means conditioned by the energizing of each relay unit of the series, except the last, during one cycle of said mechanism, for routing the impulse transmitted during the next cycle to the next relay unit of the series; means responsive to the sensing of a code designation for a particular functional operation, for disabling said control record spacing means and for initiating operation of said cycling control means by energizing the first relay control unit of said series; means for operating said second record sheet spacing means once for each of said predetermined number of operating steps, after the initial step; and means controlled by said cycling control means and operable upon the completion of its said predetermined number of operating steps for restoring said control record spacing means to its normal condition of operation.

18. In record controlled recording apparatus, cyclical operable reading means normally operable to successively sense during successive cycles code designations contained in a control record sheet and representing, respectively, character data and functional operation according to one code system; means controlled by said reading means and operable during the cycle each code designation is sensed to convert each such code designation sensed into a code designation of a different code system and to record the latter designation in a second record sheet; means normally operable to space said second record sheet once for each recording operation so as to bring a blank recording area into recording position; cycling control apparatus effective when initiated to operate in a predetermined number of succeeding steps and comprising a plurality of relay control units equal in number to said operating steps and being adapted to be energized in a prescribed serial order, a mechanism operating continuously in recurring cycles while said cycling control apparatus is operating, an impulse transmitting means responsive to said mechanism and providing at least one energizing impulse for each cycle of said mechanism, and means conditioned by the energizing of each relay unit of the series, except the last, during one cycle of said mechanism, for routing the impulse transmitted during the next cycle to the next relay unit of the series; means responsive to the sensing of the code designation for a particular functional operation, for disabling said reading means and for energizing the first relay unit of said series so as to initiate operation of said cycling control apparatus; means controlled by said cycling apparatus and operable after the recording in said different code of the code designation representing said particular functional operation, for effecting operation of said spacing means for said second record sheet once for each of said predetermined number of steps after the initial step; and means controlled by said cycling apparatus upon a completion of said predetermined number of operating steps for restoring said reading means to its normal condition of operation.

19. In record controlled recording apparatus, mechanism operating continuously in recurring cycles; reading means controlled by said mechanism and normally operable to sense successively code designations recorded in a control record sheet according to one code system and representing, respectively, character data and functional operations; means controlled by said reading means and operable to translate each such sensed code designation into a designation of a different code system and to record the latter designation in a second record sheet; means normally operable to space said second record sheet once for each recording operation so as to bring a blank recording area into recording position; cycling control means effective when initiated to operate in a predetermined number of succeeding steps and comprising a plurality of relay control units equal in number to said operating steps and being adapted to be energized in a prescribed serial order, and impulse transmitting means responsive to said mechanism and providing at least one energizing impulse for each cycle of said mechanism, and means conditioned by the energizing of each relay unit of the series, except the last, during one cycle of said mechanism, for routing the impulse transmitted during the next cycle to the next relay unit of the series; means responsive to the sensing of a preselected code designation for stopping operation of said reading means and for energizing the first relay unit of the series and thereby to initiate operation of said cycling means; means effective upon the initiation of the operation of said cycling means for operating said spacing means for the second record sheet once for each of said predetermined number of operating steps after the initial step; and means controlled by said cycling means for rendering the latter ineffective at the completion of said predetermined number of operating steps and for restoring said reading and said spacing means to their normal operating condition.

20. Cycling control apparatus adapted to control an operation of a recording machine and effective when initiated to operate in a predetermined number of succeeding steps; said apparatus comprising, in combination, a plurality of relay control units equal in number to said operating steps and being adapted to be energized in a prescribed serial order and each relay unit comprising first and second companion relays; mechanism operating continuously in recurring cycles while said cycling control apparatus is effective; an impulse transmitting means responsive to said mechanism and providing first and second differentially timed impulses for each cycle of operation of said mechanism; means for initiating operation of said apparatus by energizing the first relay of the first unit; means controlled by said relays for routing during an operating cycle of said mechanism, a second impulse from said impulse transmitting means to the companion second relay of the first unit and thereafter during each succeeding cycle of said mechanism for routing the first impulse to the first relay and the second impulse to its companion second relay of the next relay unit in the serial order to be energized, until all relay units have been progressively energized; and means controlled by the energizing of the second relay of the last unit of the series for deenergizing the relays then energized and thereby rendering said cycling control apparatus ineffective.

21. Cycling control apparatus adapted to control an operation of a recording machine and effective when initiated to operate in a predetermined number of succeeding steps; said apparatus comprising, in combination, a plurality of relay control units equal in number to said operating steps and being adapted to be energized in a prescribed serial order and each relay unit comprising first and second companion relays; mechanism operating continuously in recurring cycles while said cycling apparatus is effective; and impulse transmitting means responsive to said mechanism and providing first and second differentially timed impulses for each cycle of operation of said mechanism; means for initiating operation of said apparatus by energizing the first relay of the first unit; means controlled by said relays for routing during an operating cycle of said mechanism, a second impulse from said impulse transmitting means to the companion second relay of the first unit and thereafter during each successive cycle of said mechanism for routing the first impulse to the first relay and the second impulse to its companion second relay of the next relay unit in the serial order to be energized, until all relay units have been progressively energized; said routing means including contact points forming a part of the first companion relay of each of said units and operable upon energization of their related relay to condition the energizing circuit for its companion second relay, and including contact points forming a part of the second relay of each of said units, except the last unit of the series, and operable upon energization of their related relay to condition the energizing circuit for the first relay of the next succeeding relay unit of the series; and means effective upon the energizing of the second relay of the last unit of the series for deenergizing the relays then energized and thereby rendering said cycling control apparatus ineffective.

EDWARD J. RABENDA.

Certificate of Correction

Patent No. 2,412,422. December 10, 1946.

EDWARD J. RABENDA

It is hereby certified that error appears in the printed specification of the above numbered patent requiring correction as follows: Colum 35, line 16, claim 1, for the word "member" read *number*; and that the said Letters Patent should be read with this correction therein that the same may conform to the record of the case in the Patent Office.

Signed and sealed this 1st day of April, A. D. 1947.

[SEAL]

LESLIE FRAZER,
*First Assistant Commissioner of Patents.*